US011853114B1

(12) United States Patent
Ridoux et al.

(10) Patent No.: US 11,853,114 B1
(45) Date of Patent: *Dec. 26, 2023

(54) VIRTUALIZED HARDWARE CLOCKS FOR PROVIDING HIGHLY ACCURATE TIME INFORMATION IN HOSTED MACHINE INSTANCES

(71) Applicant: Amazon Technologies, Inc., Seattle, WA (US)

(72) Inventors: Julien Ridoux, Seattle, WA (US); Joshua Benjamin Levinson, Seattle, WA (US); Alan Michael Judge, Dublin (IE); Colin Whittaker, Dublin (IE); James Paul Rivers, Capitola, CA (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/643,796

(22) Filed: Dec. 10, 2021

(51) Int. Cl.
*G06F 1/10* (2006.01)
*G06F 1/08* (2006.01)
*G06F 1/12* (2006.01)
*G06F 1/14* (2006.01)

(52) U.S. Cl.
CPC ............... *G06F 1/12* (2013.01); *G06F 1/10* (2013.01); *G06F 1/14* (2013.01)

(58) Field of Classification Search
CPC ..................................... G06F 1/12; G06F 1/10
See application file for complete search history.

(56) References Cited

U.S. PATENT DOCUMENTS

| 9,459,652 | B1* | 10/2016 | Landers | G06F 1/12 |
|---|---|---|---|---|
| 10,503,534 | B1* | 12/2019 | Southgate | G06F 9/5055 |
| 11,068,231 | B2* | 7/2021 | Coburn, IV | G06F 3/162 |
| 11,300,992 | B2* | 4/2022 | Inforzato | G06F 1/12 |
| 2002/0026321 | A1* | 2/2002 | Faris | A63F 13/216 |
| | | | | 705/311 |
| 2009/0132846 | A1* | 5/2009 | Song | G06F 1/14 |
| | | | | 713/502 |

(Continued)

OTHER PUBLICATIONS

U.S. Appl. No. 17/643,785, Highly Accurate Time Information in Hosted Machine Instances Using Dedicated Timing Network, filed Dec. 10, 2021.

*Primary Examiner* — Phil K Nguyen
(74) *Attorney, Agent, or Firm* — Knobbe, Martens, Olson & Bear, LLP

(57) ABSTRACT

Systems and methods are provided for highly accurate synchronization of machine instances in a distributed, hosted computing environment to a reference timekeeper. In addition to a general communication network accessible to machine instances, the distributed environment includes a second network dedicated to carrying time information, such as a pulse-per-second (PPS) signal to isolated timing hardware within host computing devices. The isolated timing hardware can use the PPS signal, along with a reference time, to set a hardware clock. The isolated timing hardware can further provide an interface to machine instances that enables the instances to read the time of the hardware clock. This configuration enables many instances can share access to a single reference timekeeper, thus synchronizing those instances to a much higher accuracy than in traditional network-based time protocols.

20 Claims, 9 Drawing Sheets

(56) References Cited

U.S. PATENT DOCUMENTS

| | | | | |
|---|---|---|---|---|
| 2010/0316009 A1* | 12/2010 | Han | .................. | H04L 43/024 370/329 |
| 2012/0099541 A1* | 4/2012 | Park | .................. | H04W 72/56 370/328 |
| 2020/0162234 A1* | 5/2020 | Almog | .................. | H04L 7/10 |
| 2020/0334362 A1* | 10/2020 | Stoler | .................. | G06F 21/577 |

* cited by examiner

VIRTUALIZED HARDWARE CLOCKS FOR PROVIDING HIGHLY ACCURATE TIME INFORMATION IN HOSTED MACHINE INSTANCES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources. These virtual machines may carry out a wide variety of functionalities otherwise possible on a non-virtualized hardware device, such as invoking network-accessible services, conducting data processing, and the like.

In some cases, multiple computing devices (either virtual or physical) may be interconnected to provide desired functionality. Such devices may be referred to as "distributed," such as by implementing a distributed service or a distributed computing environment. One challenge that often occurs in distributed computing (and in various other computing contexts) is the difficulty of creating a shared notion of time. It may be desirable to use time information to implement various policies in a computing service, such as considering a first of multiple conflicting requests as authoritative. However, in the distributed context, each device may have an independent notion of time, and as such it may be difficult or impossible to determine which of a set of conflicting requests actually occurred first. A variety of techniques exist to attempt to synchronize time between networked computers. For example, the Network Time Protocol (NTP) enables computing devices to communicate with a reference timekeeper over a network and receive a current time. These techniques are typically not sufficiently accurate, or are too complex to implement in wide-scale distributed computing platforms, particularly hosted computing platforms.

DETAILED DESCRIPTION

Figure 1:
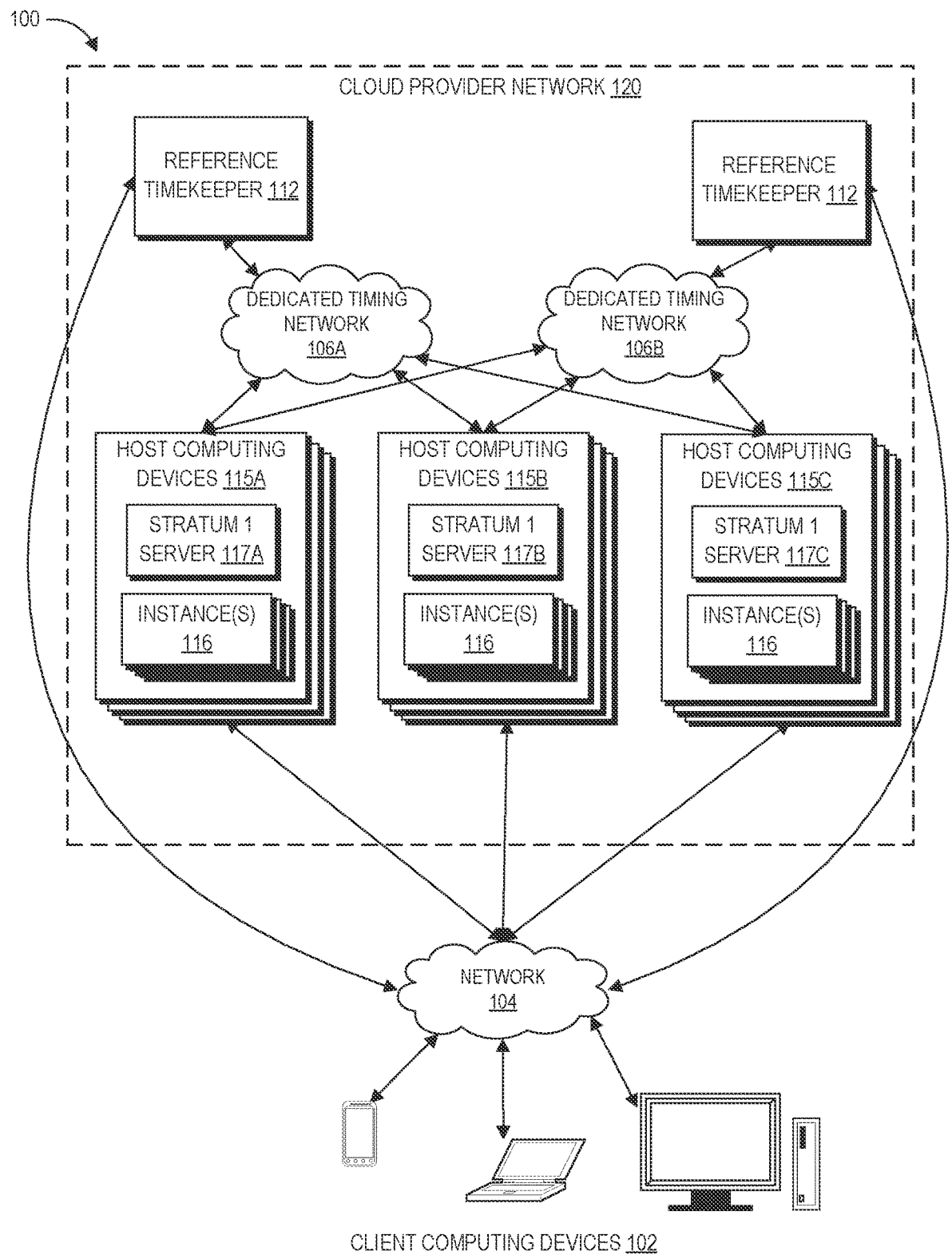
FIG. 1 depicts an example computing environment including a cloud provider network in which embodiments of the present disclosure can be implemented to provide highly accurate time information to hosted machine instances by use of a dedicated time network.

Generally described, aspects of the present disclosure relate to providing machine instances in a hosted computing environment with highly accurate time information, such that the instance can be synchronized within microseconds or nanoseconds to a reference timekeeping device (and thus, within microseconds or nanoseconds or other devices synchronized to the reference timekeeping device). More specifically, embodiments of the present disclosure provide for data centers including two distinct communication networks: a first packetized data network supporting standard network communications of instances, and a second network dedicated to providing time information, such as a pulse-per-second signal. The dedicated time network may include one or more reference timekeeping devices configured to provide highly accurate time information, such as by synchronization to a global navigation satellite system (GNSS), like the global positioning system (GPS). Host computing devices within a data center may be provisioned with hardware that accepts time information from the dedicated time network and uses that time information to maintain highly accurate time relative to the reference timekeeper. The hardware may further provide an interface through which machine instances hosted by the host computing device can query for an receive time information. For example, the hardware may provide an NTP server that enables hosted instances to query for time information in a manner similar to traditional network-based NTP time synchronization, or may provide a virtualized Precision Time Protocol (PTP) hardware clock (PHC). Because time information is provided by hardware local to the hosted instances, and need not traverse a network, the time information may be highly accurate relative to traditional NTP, such as within 100 microseconds, within 20 microseconds, or less. Further, embodiments of the present disclosure can provide for multiple dedicated time networks, and for selection of a network to be used for time information based on analysis of those networks, further increasing accuracy in timekeeping. In some embodiments, a machine instance may be provided with error-band information for timing data, such that the instance is not only provided with highly accurate timing data, but knowledge of how accurate that data is.

A known and long-standing problem within distributed computing systems is the difficulty is synchronizing time information between devices. Many computing devices utilize crystal oscillators to keep time. These oscillators, in theory, operate at a known frequency, and thus time can be measured by the signal provided by an oscillator. However, in practice the frequency of an oscillator varies based on various factors, such as operating temperature. While frequency variation may be minute, it can be sufficient to cause substantial desynchronization between two different devices. Another source of error in time synchronization is the mechanism by which two devices are synchronized. In general, synchronization becomes less accurate as devices are moved further apart, as the laws of physics dictate a maximum speed at which time information can move between devices, which speed is further reduced by various limitations of the equipment used to transmit data between devices. While time synchronization techniques can attempt to overcome this problem by adjusting for transmission time, this approach has its limits. For example, it cannot generally account for asymmetrical delays, where a round-trip communication time between two devices is unevenly split between and outgoing and returning communication path. In this case, a first device may receive time information from a second device, but be unsure as to how much time has elapsed during transmission of the information from the second to the first device. Moreover, such techniques generally cannot account for variance in transmission times, which may occur for example due to congestion on a network. Thus, time information is inaccurate.

While these inaccuracies may be trivial in non-computerized environments (as human interactions are rarely concerned with microsecond differences in notions of time), they can create significant problems in computerized environments. For example, computerized transaction handling may be required to address conflicting, near-simultaneous transactions. In a distributed system, various complex techniques must be adopted to attempt to address such transactions, as merely using a "transaction time" at each distributed device may introduce unexpected results given potentially different notions of time at each device. Similarly, some computer applications, such as handling of financial transactions, demand highly accurate timestamping, which in turn requires highly accurate time on a device.

One mechanism for addressing these problems would be to equip every computing device with a highly accurate reference timekeeping device. For example, each device may have installed within it an atomic clock, which is manually synchronized with an initial reference point (e.g., by physically co-locating the atomic clock and the reference point). Alternatively, each device may have installed a GNSS receiver configured to determine a present time by reference to a GNSS. Neither approach is feasible at large scale, both due to the cost and complexity of these time keeping devices and the logistical problems with setting up and maintaining such devices.

One large scale application where accurate time information may be desired is in hosted computing environments, sometimes referred to as "cloud computing" environments. One tenant of such environments is hardware commoditization: users of such environments are often provided with a general outline of the hardware on which a hosted machine instance will execute, but are relieved of selecting and maintaining individual hardware. This provides for extreme flexibility—failure of a single set of hardware can be addressed, for example, by invisibly relocating a hosted machine instance to another set of hardware. In the context of cloud computing, time synchronization becomes particularly problematic, as hosted computing environments often span multiple data centers within a given geographic region and multiple geographic regions around the globe. If such environments attempt to provide synchronization among all hosted machine instances, there may be an expectation that such synchronization does not depend on the particular hardware hosting the instance, the particular location of that hardware, or the like. Accordingly, given the limitations to time synchronization noted above, providing accurate time information across a hosted computing environment is very difficult.

Embodiments of the present disclosure address the above-noted problems by providing highly accurate time information at hosted machine instances in a manner that does not require a per-instance reference timekeeping device and that preserves flexibility of the hosted computing environment by requiring little or no modification to operation of hosted machine instances. More specifically, embodiments of the present disclosure provide for one or more reference time keeping devices within a data center to be synchronized with host computing devices in that data center by use of a dedicated time information network, used exclusively for transmission of time information. The dedicated time network may provide highly accurate (e.g., to the nanosecond level) time information to hosting hardware of host computing devices. This hosting hardware, in turn, may make such time information available to computing devices hosted via the hosting hardware. The hosting hardware may provide a variety of interfaces for receiving time information, such as by being addressable as a network timing server or as a virtualized hardware device of the machine instance. Accordingly, a reference timekeeping device may be shared among a large number of hosted machine instances in a manner that allows each instance to be commonly configured potentially without knowledge of the underlying physical structure providing time information. These techniques therefore enable widescale deployment of highly accurate time information, enabling devices within a data center to synchronize to one another within very small time windows (e.g., under 100 microseconds, 20 microseconds, or potentially on the nano-second level). Moreover, by deploying similarly configured reference timekeeping devices at multiple data centers, each of which synchronizes to a common timekeeping system (such as a GNSS), hosted machine instances across data centers may similarly synchronize time with one another, providing for time-dependent functionalities not possible under current synchronization techniques.

As disclosed herein, a data center may include a number of host computing devices interconnected via a non-dedicated, packet-switched communication network. Each host computing device may host one or more machine instances, which may include virtual machine instances (e.g., with virtualized hardware provided by software executing on the host device, such as a hypervisor) or a bare metal instance (e.g., an instance with direct access to hardware of the host computing device). Machine instances may communicate via the non-dedicated network and with a wider network, such as the Internet. In addition, a data center may include one or more dedicated networks carrying time information. Illustratively, each dedicated time network may be connected to a reference timekeeper device, such as a GNSS-connected timing device. The reference timekeeper device may transmit a PPS signal (or other fixed-width signal) via the dedicated time network, which may thus be broadcast to receiving devices on the network. The dedicated time network can be configured to maintain extremely high level of accuracy for the time information, potentially on the order of nanoseconds. For example, the dedicated time network may implement the Synchronous Ethernet (SyncE) standard to maintain syntonization between devices of the network, or may implement designs and protocols of the White Rabbit Project, a network design known in the art that itself utilizes SyncE, to facilitate distribution of time information. Each host computing device may include hardware that interfaces with and receives the signal from the dedicated time network, thus facilitating synchronization between the host computing device and the reference timekeeping device. In one embodiment, the dedicated time network carries a PPS (or other fixed-width) signal from a reference time keeper exclusively, which signal is aligned to the relevant time boundary (e.g., which pulses at the correct second boundary). Accordingly, to determine a current time, it may be necessary for the hardware also to obtain a reference point, indicating which second it currently is. As this reference point need not be highly accurate in order to achieve synchronization, the hardware may obtain the reference point via the non-dedicated network, such as via communication with an NTP server on the non-dedicated network. The hardware may then determine the current time to a high degree of accuracy by combining the reference point with second boundary indicated by the PPS signal. Moreover, the hardware device may provide an indication of the current time to machine instances hosted on the host computing device.

In one embodiment, the hardware within each host computing device that is used to provide time information is distinct from hardware used to host machine instances. For example, the hardware used to provide time information may be a physical offload card connected to other hardware of the host computing device via a Peripheral Component Interconnect (PCI) Express bus. The offload card may include independent computing resources, such as an independent processor and memory, to avoid contention for resources with hosted machine instances. In some cases, a portion of these resources may be dedicated to processing of time information, to further avoid potential issues related to resource contention.

A hosted machine instance may illustratively interface with the above-noted hardware of a host computing device in order to obtain time information. In one embodiment, the hardware may be accessible to the machine instance via the non-dedicated network. For example, the hardware may provide the machine instance with access to the non-dedicated network (e.g., the physical ethernet of the host computing device may pass through the hardware), and thus be addressable via that network (without requiring communications to actually leave the host computing device). Accordingly, the hardware may make a current time available via the non-dedicated network. For example, the hardware may present an NTP server, such that a machine instance can direct an NTP query to the hardware to obtain a current time. Unlike traditional NTP communications (which typically traverse a network), communications with the hardware can occur internally to the host computing device and thus obtain a very low latency. As a result, this type of NTP time synchronization can achieve high accuracy, such as within 100 microseconds. In some embodiments, the hardware may additionally or alternatively be presented to machine instances as a virtualized hardware device. For example, the hardware may be presented to a machine instance as a virtualized PPS device (e.g., as "/dev/pps" within a Unix-like operating system) that transmits a per-second interrupt to the machine instance, usable to synchronize time of the instance.

In combination, the use of a dedicated time network and a highly-accurate hardware time source within a host computing device provides a number of benefits. Specifically, the use of a dedicated time network can reduce the effective "distance" between the reference timekeeper device (e.g., a GNSS time keeper) and the hardware time source within each host computing device, enabling a single reference timekeeper device to shared among machine instances as a local or near-local time reference. The hardware time source within each host can then be interacted with in a variety of manners (e.g., via normal network communications of a machine instance or interrupts provided by a virtualized hardware device) according to a configuration of the machine instance. As a result, highly accurate time information is provided to hosted machine instances in a manner may require no reconfiguration of the instance itself. Effectively, the instance can operate as it would in a traditional configuration. However, in the case of the instance using network timing, time information provided via the network (from the point of view of the instance) appears to be highly accurate relative to conventional techniques. Moreover, rather than requiring a dedicated reference timekeeper at each host computing device, a dedicated reference timekeeper can be shared among multiple host computing devices via the dedicated network, enabling scalability that is not possible via individualized reference timekeepers. Accordingly, this configuration preserves the flexibility provided by virtualization while greatly increasing the accuracy of time information available at hosted machine instances.

In some embodiments, a dedicated time network may include multiple reference timekeeping devices, each of which for example transmits PPS (or other fixed-width) signals among a portion of the network. One or more devices within the dedicated time network may be configured to select among the signals provided by each timekeeping device in order to identify a "lead" signal to follow as a source of time. Illustratively, host computing devices in a data center may be physically arranged into units, such as racks. Each rack may include a switch on the dedicated time network with logic to select among multiple signals, each provided by a different reference timekeeping device. The switch may include hardware, such as a field-programmable gate array (FPGA), that can be configured to provide at very low latency a selected signal to each host computing device on the unit. Accordingly, the switch may inspect the available signals, select an appropriate signal, and reconfigure the FPGA to provide the signal to the devices of the unit. To facilitate seamless operation, the switch may include multiple FPGAs, such that a first FPGA can continue to send time information from a prior reference timekeeping device while a second FPGA is configured to send such time information from a new reference timekeeping device.

In one embodiment, the switch selects a reference time signal based on a consensus algorithm. For example, if a majority (or other consensus threshold) of signals occur within a threshold period, the switch may select a single from that set (e.g., an earliest, latest, closest to average, etc.) to provide to host computing devices of the unit. In another embodiment, the switch selects a reference timekeeping device based on metadata regarding the reference timekeeping devices, the dedicated time network, or a combination thereof. For example, a data center may include a computing device configured to conduct timekeeping analysis to detect delays or other issues that may prevent a reference timekeeping device from delivering an accurate signal. The analysis device may deliver such information to a per-unit switch to facilitate signal selection. While signal selection is discussed herein with respect to a per-unit switch, in some cases other elements of the dedicated time network, including hardware of host computing devices, may conduct such signal selection.

In addition to monitoring for issues on the dedicated time network, in some embodiments an analysis device may conduct analysis with respect to individual network devices or host computing devices. As noted above, one source of error in timing at an individual computing device is changes in signal speed of a crystal oscillator within the device. In many cases, such changes are largely a function of temperature—with signal frequency increasing as temperature increases. Often, such devices have a manufacturer-specified curve that specifies a particular frequency range at a particular temperature. However, such curves are typically aggregates among many manufactured devices, and thus not specific to an individual device. Accordingly, adjusting time information at a device per manufacturer-specified curves may result in inaccuracies. Notably, these inaccuracies may be significant even when time information is provided by a reference timekeeping device, because internal time information of another device may be used to address delays in signal from a reference timekeeping device. For example, if the round-trip latency between a reference timekeeping device and another device is 10 microseconds and a network is configured to be (as much as possible) symmetrical, the other device may adjust the signal by 5 microseconds to account for network latency between the reference timekeeping device and the other device. However, if the other device has inaccurate time information, it may be unclear as to what constitutes 5 microseconds. Thus, accounting for internal frequency variations can be a significant element to maintaining accurate time information.

To account for internal frequency variations, embodiments of the present disclosure may include an analysis computing device configured to conduct an analysis of time information from one or more other devices with respect to temperature of those other devices. For example, the analysis device may collect or otherwise calculate latency information between each device and another device (e.g., a nearest other device) on a network, such as the dedicated time network. The analysis device may analyze the latency information with respect to a temperature of the monitored device, to detect variations in the latency that may be attributable to temperature-based frequency shift on the monitored device. From such analysis, the analysis device may generate temperature-based offsets for the monitored device, such that the device may apply the offset for a current temperature to its internal clock, thereby accounting for temperature-based frequency shift. With conventional timing techniques, such analysis may not be possible, as noise within timing measurements may overwhelm any "signal" of frequency shift. However, the highly accurate time information available within embodiments of the present disclosure can enable such analysis. In conjunction with highly accurate time information from a dedicated time network, this frequency shift offset may further increase the accuracy of time information at computing devices as discussed herein.

As will be appreciated by one of skill in the art in light of the present disclosure, the embodiments disclosed herein improve the ability of computing systems to provide highly accurate time information to hosted machine instances without requiring specialized configuration of such hosted machine instances. Moreover, the presently disclosed embodiments address technical problems inherent within computing systems; specifically, the difficulty of establishing a common notion of time within a distributed computing system with a high degree of accuracy, and the difficulty of providing highly accurate time information across a fleet of distributed computing devices. These technical problems are addressed by the various technical solutions described herein, including the use of isolated timing hardware within a host computing device to synchronize to a reference timekeeper device by use of a dedicated time network, and the use of the isolated timing hardware to provide a local interface for time information to hosted machine instances. Thus, the present disclosure represents an improvement in host devices and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented. The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The cloud provider network 120 can additionally offer a time synchronization service as described herein by providing stratum 1 servers 117 locally addressable within each host computing device 115 configured to provide time information to instances 116. The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes sets of host computing devices 115, labeled as set 115A, 115B, and 115C in FIG. 1. Each set can represent a logical group of devices 115, such as a physical "rack" of devices. Each device can support one or more hosted machine instances 116. Host machine instances 116 may be virtual machine instances, representing virtualized hardware (supported by underlying hardware of the devices 115) supporting, e.g., an operating system and applications. Hosted machine instances 116 may further represent "bare metal" instances, whereby a portion of the computing resources of the device 115 directly support (without virtualization) the instance 116. In some cases, an instance 116 may be created and maintained on behalf of a client. For example, a client may utilize a client computing device 102 to request creation of an instance 116 executing client-defined software. In other cases, instances 116 may implement functionality of the cloud provider network 120 itself. For example, instances 116 may correspond to block storage servers, object storage servers, or compute servers that in term provide block storage, object storage, or compute, respectively, to client computing devices 102. While block storage, object storage, and compute are example services, instances 116 can additionally or alternatively represent domain name services ("DNS") servers, relational database servers, servers providing serverless computing services, and other server services for supporting on-demand cloud computing platforms. Each host computing device 115 includes hardware computer memory and/or processors, an operating system that provides executable program instructions for the general administration and operation of that server, and a computer-readable medium storing instructions that, when executed by a processor of the server, allow the server to perform its intended functions. While not shown in FIG. 1, the cloud provider network 120 may include other computing devices facilitating operation of the host computing devices 115, such as data stores to store account information, computing devices to implement logging, monitoring, and billing services, etc.

The cloud provider network 120 can provide on-demand, scalable computing platforms to users through the network 104, for example allowing users to have at their disposal scalable "virtual computing devices" via their use instances 116 or services provided by such instances 116. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations, regional edge cache servers. This compartmentalization and geographic distribution of computing hardware enables the cloud provider network to provide low-latency resource access to customers on a global scale with a high degree of fault tolerance and stability. In some implementations, the cloud provider network can include one or more cellular networks managed and provided by the cloud provider. The elements shown in FIG. 1 illustratively represent a collection of elements present in a single region or availability zone. These elements may thus be replicated in each such region or availability zone.

As illustrated in FIG. 1, instances 116 can communicate over network 104 with each other and with client computing devices 102. The network 104 can include any appropriate network, including an intranet, the Internet, a cellular network, a local area network or any other such network or combination thereof. In FIG. 1, the network 104 is illustratively a general purpose communication network, such as the Internet. Accordingly, the network 104 may contain packetized information enabling arbitrary data exchange between networked devices. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client device 102 can generally refer to any device accessing a network-accessible service as a client of that service.

In addition to the network 104, the host computing devices 115 are connected to multiple dedicated time networks 106, denoted as networks 106A and 106B. Each dedicated time network 106 is further connected to one or more reference timekeepers 112, which act as a point of reference for time information delivered via the network. For example, each reference timekeeper 112 may be an atomic clock or a GNSS receiver, and may thus act as a source of highly accurate time information for devices 115 within the network 120. In one embodiment, each different reference timekeeper 112 is synchronized to one another, and therefore shares to a high degree of accuracy a common time. For example, each timekeeper 112 may be synchronized to a common GNSS, such as GPS, with a high degree of accuracy (e.g., tens of nanoseconds).

Each dedicated time network 106 can include an interconnected set of devices configured to carry time information from the reference timekeeper 112 to the host computing devices 115 with minimal loss in accuracy (e.g., on the order of nanoseconds). For example, the networks 106 may include devices configured to the specifications of the White Rabbit Project, a known project to develop highly accurate timing networks. In some implementations, the dedicated time distribution network can be coupled between the GNSS receivers and every top of rack switch ("TOR") in a datacenter. To avoid issues of congestion or contention for network resources, each network 106 may be dedicated to time information, and provide such time information with little or no encoding. While shown in FIG. 1 as a distinct network, in some embodiments the dedicated time network 106 and the network 104 may utilize a common but electrically partitioned physical substrate. For example, cabling between the elements of FIG. 1 may include both wiring for the network 104 and distinct wiring for the dedicated time network 106. The respective wirings can be electrically isolated from one another such that signals traversing the network 104 do not inhibit signals traversing the dedicated time network 106. The depicted timekeepers 112 and timing networks 106 can be used to provide a time synchronization service provided by the stratum 1 servers 117. Such a service may be made available to instances 116, which may for example be customer instances provided by a compute service, instances providing other services of the cloud provider network 120 (e.g., block storage, object storage, databases, streaming data handling, authentication and authorization services, etc.).

Illustratively, each network 106A may carry exclusively a fixed signal, such as a fixed-width pulse (e.g., a pulse-per-second, or PPS, signal or other signal of fixed width, including a fixed frequency signal) that is broadcast from a single reference timekeeper 112 to downstream devices. In one embodiment, the time information indicates time passage, without a point of reference for the present time. For example, the time information may indicate the passing of each second, but not which second is passing. In instances where multiple timekeepers 112 exist within a dedicated time network 106, devices on the network, such as timing switches, may operate to select a single upstream signal from a single timekeeper 112 to use as a source of time information to propagate to downstream devices, such as host devices 115. In some embodiments, the switches may select a signal based on metadata related to the signals, as discussed in more detail below. Moreover, switches or other devices within the dedicated time network 106 may utilize other techniques to account for potential inaccuracies in the network 106. For example, the switches or other devices may account for latency on the network 106 due to physical distance between devices, such as by adjusting received time information based on expected latency (e.g., calculated based on known cable length, based on measured round trip communication time, etc.). Because the networks 106 may be dedicated to carrying time information from the reference timekeepers 112, the devices 115 may be configured to act purely as consumers of information on the networks 106, and be unable to transmit information on the networks 106.

In addition to connection to dedicated time networks 106, reference timekeepers 112 may additionally connect to the general purpose communication network 104. Illustratively, connection to the network 104 may facilitate collection of metadata regarding operation of the reference timekeepers 112, as discussed below. Moreover, in some embodiments the network 104 is utilized to provide a reference time from reference timekeepers 112 to host computing devices 115, which reference time indicates the present time. For example, where the dedicated time network 106 indicates the occurrence of a second marker, but not which second has occurred, host computing devices 115 may require a reference point to determine which second has occurred. This reference point need not share the same accuracy as time information provided by the dedicated time network 106, as a reference time may be offset by plus or minus half the period of the time information. For example, if the reference time is early by four tenths of a second, a host computing device 115 may receive the reference time and adjust the reference time to the nearest second marker as indicated by the time information of the dedicated time network 106, thus achieving time synchronization to the accuracy of the time information. In one embodiment, a reference time is transmitted over the network 104 according to a known timing protocol, such as NTP. While such protocols may not be sufficiently accurate to independently synchronize time, they may be sufficiently accurate to provide a reference time in accordance with embodiments of the present disclosure.

By utilizing a combination of a reference time (e.g., obtained via network 104) and time information obtained via a dedicated time network 106, each host computing device 115A may synchronize a local clock to that of a reference timekeeper 112. In accordance with embodiments of the present disclosure, that local clock time may then be shared with instances 116, thus synchronizing clocks of the instances 116 with the reference timekeeper 112 and, accordingly, with each other. In one embodiment, each host computing device 115 includes hardware that is isolated from that providing computing resources of the instances 116, which hardware is utilized to maintain a clock of the host computing device 115. For example, each device 115 may include an "offload" card physically installed on the device 115, which card includes separate computing resources (e.g., a distinct processor, distinct memory, etc.) from those resources used by the instances 116, where such separate computing resources can be dedicated to instance management tasks such as virtual machine management, input/output virtualization to network-attached storage volumes, local migration management tasks, instance health monitoring, and the disclosed host clock or virtualized hardware clock. In one embodiment, the card is connected to the resources used by instances 116 via a Peripheral Component Interconnect Express (PCIe) bus of the host computing device 115. Thus, the instances 116, executing on their distinct computing resources, may communicate with the card (or other isolated timing hardware) via local interfaces of the device 115, without traversing a network. Moreover, because such hardware can be isolated from that of instances 116, issues such as resource contention, which may otherwise inhibit accurate timekeeping, can be avoided.

In accordance with embodiments of the present disclosure, isolated hardware of the host computing devices 115 may operate as a stratum 1 server 117 (shown in FIG. 1 as stratum 1 servers 117A-C) for instances 116. In the parlance of certain network time protocols, "stratums" indicate distance from a reference clock. For example, "stratum 0" may indicate the reference clock, and "stratum 1" may indicate a device directly linked to the reference clock. Stratum 2 may indicate a device linked to a stratum 1 device over a network path. In FIG. 1, each host device 115 obtains time information over a dedicated time network 106 from a reference timekeeper 112 (e.g., a stratum 0 device). This enables the dedicated time network 106 to act as a "direct link" to the reference timekeeper 112, such that time information need not flow over a general communication network (e.g., network 104). Accordingly, each host computing device 115 effectively operates as a stratum 1 server 117. Moreover, because instances 116 are co-located on a host computing device 115, instances 116 may not ever traverse the network 104 to obtain time information. Accordingly, each instance 116 is enabled to synchronize to a reference timekeeper with a very high accuracy.

Figure 2:
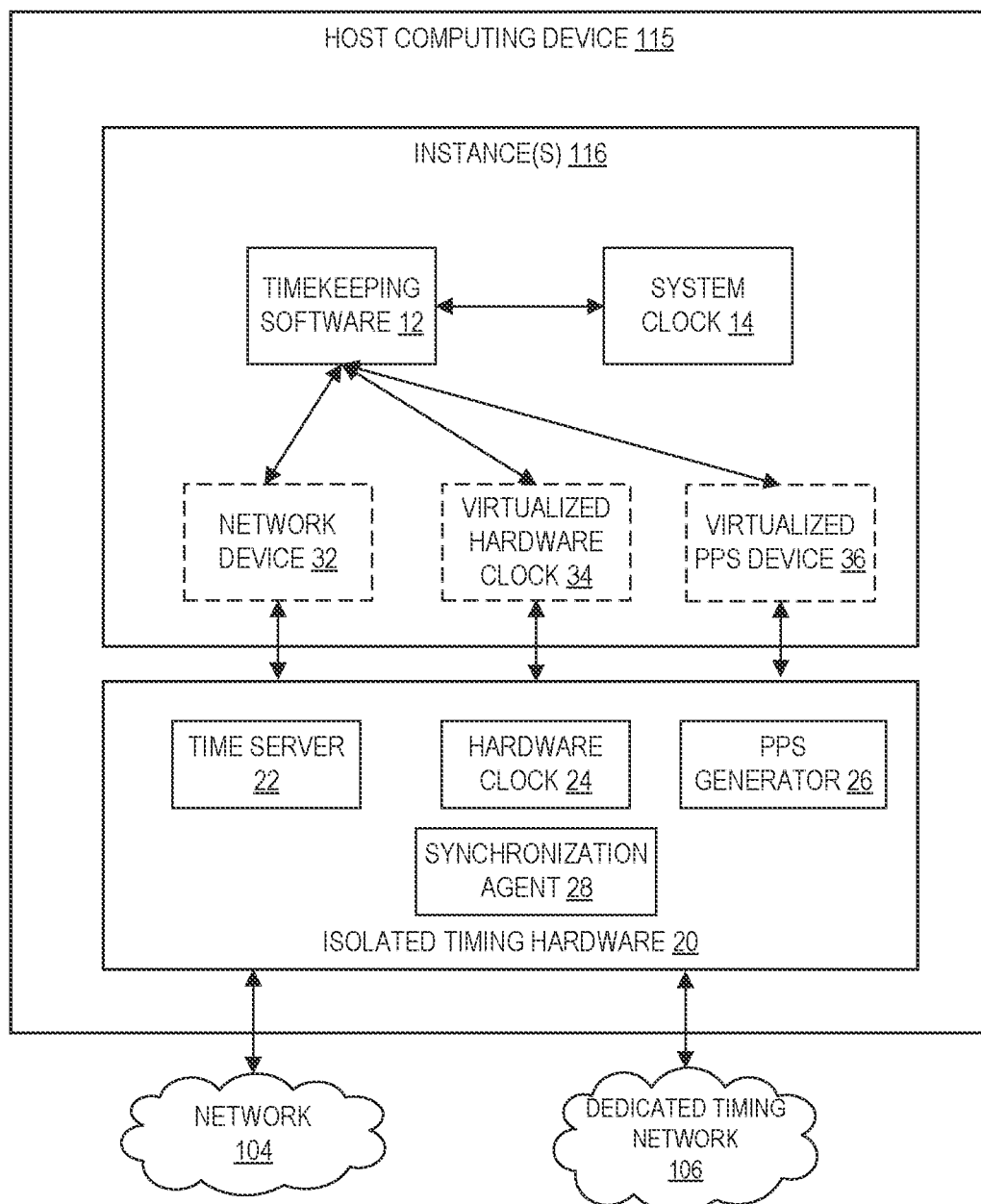
FIG. 2 depicts a logical model of a host computing device providing highly accurate time information to hosted machine instances via local interfaces to isolated timing hardware, which may be synchronized to a reference timekeeping device via a dedicated time network of FIG. 1.

Further description of synchronization between an instance 116 and a clock of the host computing device 115 will be provided with respect to FIG. 2, which depicts a logical model of elements of a host computing device 115. As shown in FIG. 2, a host computing device 115 can include isolated timing hardware 20, which may operate for example as a stratum 1 server 117 of FIG. 1. For example, the isolated timing hardware 20 can include a hardware clock 24 (e.g., an oscillator) that can be synchronized to a reference timekeeper 112 by a synchronization agent 28 based on a reference time provided by the network 104 and time information provided by the dedicated time network 106. For example, the agent 28 may consume a PPS signal from the dedicated time network 106 in order to establish second boundaries, and synchronize the hardware clock 24 to such second boundaries. The agent 28 may further periodically (e.g., every 16-32 seconds) obtain a reference time from the network 104 (e.g., according to the NTP protocol) to ensure that the clock 24 is aligned to the correct second, as indicated by the reference time. In one embodiment, the hardware clock 24 is a PTP hardware clock (PHC), which may for example be embedded within a network interface card (NIC) interfacing with the dedicated time network 106. Thus, synchronization of the hardware clock 24 may occur within hardware of the NIC, resulting in highly accurate synchronization.

To facilitate extensibility and flexibility with respect to instances 116, the isolated timing hardware 20 may provide a number of interfaces through which to obtain a present time. A system clock 14 on the instance 116 may be synchronized to the hardware clock 24 by execution of timekeeping software 12, which obtains time information from the isolated timing hardware through one or more such interfaces, and synchronizes the system clock 14 based on that time information. As shown in FIG. 2, a variety of such interfaces may be provided, including a virtualized network device 32 that enables acquisition of time information via a network-based time protocol such as NTP or the Precision Time Protocol (PTP), a virtualized hardware clock 34, and a virtualized PPS device 36.

With respect to acquisition of time information via a network-based time protocol, the hardware 20 may implement a time server 22 acting as a server for the network-based time protocol. An instance 116 may thus query for and obtain a time of the hardware clock 24 via the time server 22 according to that network time protocol. In one embodiment, such communications occur internally to the device 115, and thus never traverse the network 104. For example, a network interface of the host computing device 115 may exist within the isolated timing hardware 20 (e.g., within an offload card providing such hardware 20), and the host computing device 115 may provide a virtualized network device 32 via that hardware 20. Accordingly, network communications from the instance 116 may traverse the isolated timing hardware 20 prior to transmission on the network 104. In the case of queries to the time server 22, the hardware 20 may intercept such transmission and provide a response, thus foregoing transmission on the network 104. In this manner, the instance 116 is enabled to utilize a network protocol to synchronize time without incurring the typical decrease in accuracy that occurs when the network protocol is implemented on a physical substrate network.

Additionally or alternatively, the isolated timing hardware 20 may provide access to the hardware clock 24 via a virtualized hardware clock 34 of the instance 116. Similarly to a virtualized network device 32, the virtualized hardware clock 34 can represent software executing on the host computing device 115 that appears, from the point of view of the instance 116, to represent hardware. For example, the virtualized hardware clock 34 may be represented in a Unix-like operating system of the instance 116 as a device (e.g., "/dev/phc"). The instance 116 may thus query the virtualized hardware clock 34 to obtain a time from the isolated timing hardware 20. Illustratively, queries to the virtualized hardware clock 34 may be handled by the synchronization agent 28, which obtains a current time from the hardware clock 24 and returns the time in response to the query, as a response from the virtualized hardware clock 34.

In some cases, the synchronization agent 28 may implement load-balancing techniques to avoid congestion of such queries. For example, if many instances 116 are supported by a device 115 and each such instance 116 simultaneously queries for a time, the synchronization agent 28 may become congested, such that a response to the final query is delayed sufficiently to cause a loss in accuracy. Accordingly, the synchronization agent 28 may implement load balancing to ensure that an instance 116 does not monopolize the hardware clock 24. Illustratively, the agent 28 may implement random selection, such that queries are responded to in a randomized order rather than a first-in-first-out (FIFO) order. In another embodiment, the agent 28 may implement a "backpressure" mechanism, such that when congestion occurs at the agent 28, responses are delayed or denied (which may in turn instruct the instance 116 to query for a present time less frequently or according to a different cadence). Because each instance 116 can contain a system clock 14 backed by its own hardware (e.g., according to a frequency of its processor), the instance 116 need not constantly query the isolated timing hardware 20 for time information. Rather, such queries may occur with sufficient frequency to counteract drift of the system clock 14. Illustratively, if the system clock 14 drifts no more than a few microseconds each second, synchronizing to the hardware clock 24 once per second is sufficient to ensure that the system clock 14 is accurate to the hardware clock 24 within a few microseconds. Because each synchronization operation is expected to complete very quickly (on the order of milliseconds or less), one hardware clock 24 is enabled to support synchronization of a large number of instances 116 without congestion.

Additionally or alternatively to the time server 22 and the hardware clock 24, the isolated timing hardware 20 may include a PPS generator 26 which passes a PPS signal (e.g., obtained from the dedicated time network 106) to instances 116 via a virtualized PPS device 36. Like the virtualized hardware clock 34, the virtualized PPS device 36 may be presented, to the instance 116 as hardware but instead by backed by software of the device 115. In the case of a virtualized PPS device 36, the PPS generator 26 may periodically cause each virtualized PPS device 36 to generate interrupts that are aligned with the PPS signal obtained from the dedicated time network 106. Thus, rather (or in addition to) than querying for a current time, each instance 116 may directly obtain the PPS signal, enabling synchronization of the system clock 14. For example, timekeeping software 12 may obtain the PPS signal from the virtualized PPS device 36 (e.g., by monitoring for interrupts) and ensure that the system clock 14 is aligned to the PPS signal. Because interrupts may be broadcast to all instances 116, use of a PPS generator 26 may reduce or eliminate congestion or contention for resources of the hardware clock 24 that may otherwise occur with respect to time queries.

Accordingly, the configuration of FIG. 2 provides for highly accurate synchronization of a host computing device 115 with a reference timekeeper 112, and for providing time information to instances 116 in highly extensible manner. Notably, the configuration of FIG. 2 requires little or no re-configuration of an instance 116 relative to more conventional configurations. For example, an instance 116 configured to obtain time information via a known network protocol such as NTP may continue to obtain time information via that protocol, albeit with extremely increased accuracy relative to network-based communications. Similarly, an instance 116 configured to synchronize based on local hardware, like a local PPS device or hardware clock, may continue to synchronize based on "local" hardware provided in the form of a virtualized device, without requiring the instance 116 to be hosted on a device 115 that includes a dedicated PPS device or hardware clock (and without requiring, for example, a GPS device or atomic clock to by dedicated to the device 115). Thus, the configuration of FIG. 2 provides for highly scalable, highly accurate time keeping among a fleet of distributed devices 115.

Figure 3:
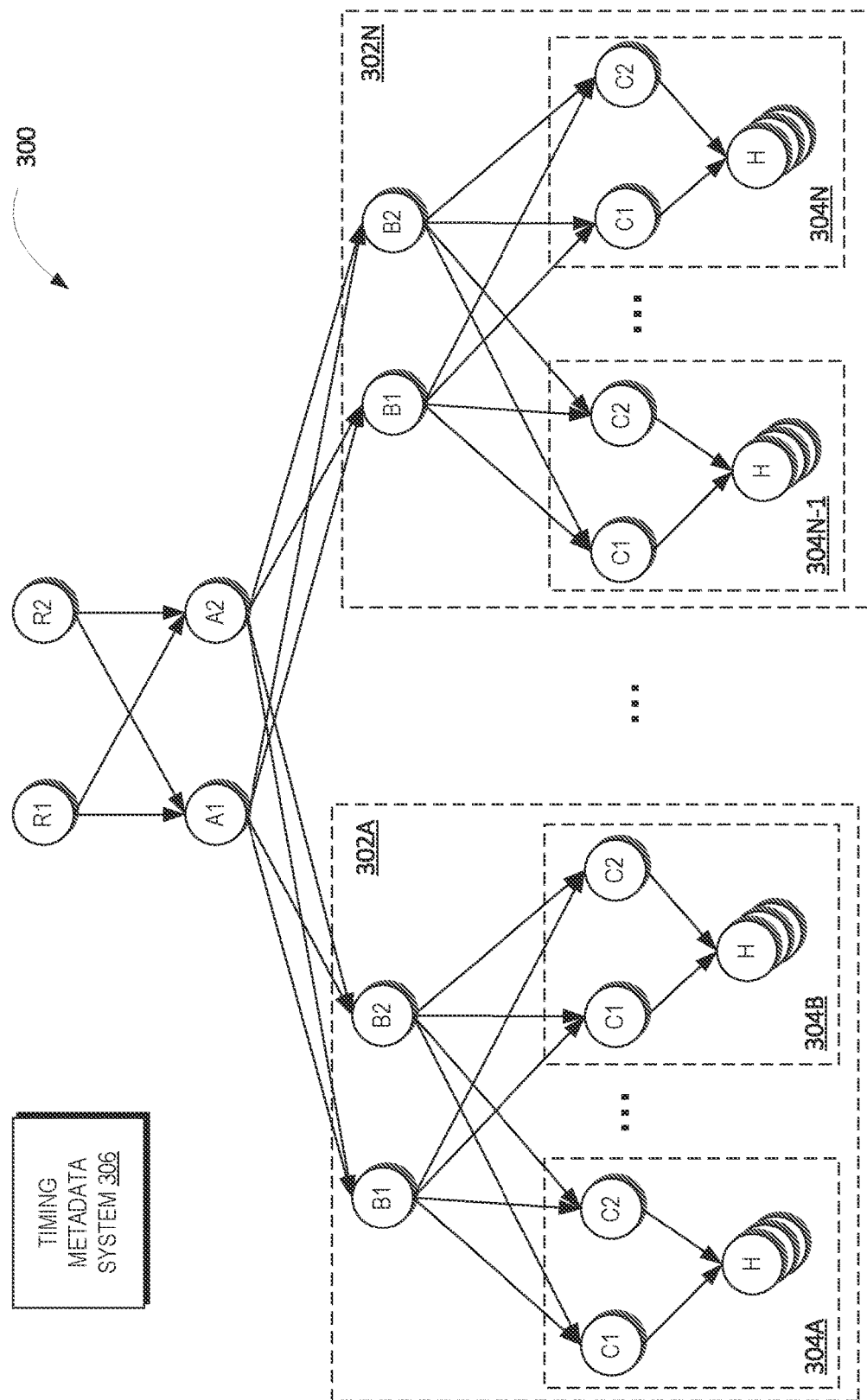
FIG. 3 depicts an example topology of a dedicated time network of FIG. 1.

With reference to FIG. 3, one example configuration 300 of a dedicated time network 106 will be described, which configuration may represent, for example a single dedicated time network 106 within a data center within the cloud provider network 120. The configuration 300 is shown in FIG. 3 as a directed acyclic graph (DAG), with information flowing from reference timekeepers 112, shown in FIG. 3 as nodes R1 and R2, through the network 106 and to host computing devices 115, shown in FIG. 3 as nodes H. The configuration 300 thus includes network devices, such as switches, that connect nodes R1 and R2 to nodes H. Illustratively, the configuration includes at least two duplicated nodes at each level for redundancy and resiliency. For example, a second level of the configuration 300 includes nodes A1 and A2, which in turn communicate with a third level of the configuration designated as nodes B1 and B2. At the third level (which may be referred to as a "distribution" level), nodes are logically grouped into sets 302, each including a node B1 and B2. FIG. 3 shows two such sets 302, set 302A and 302N. However, the configuration may include any number of sets 300. Similarly, at the fourth level (which may be referred to as an "aggregation" level), nodes are logically grouped into level 4 sets 304, denoted in FIG. 3 as level 4 sets 304A-N. Each level 4 set 304 includes two network nodes C1 and C2 that provide time information from the network 106 to a logical grouping of host computing devices 115, shown as nodes H. This logical grouping may represent, for example, a physical rack of such devices. Illustratively, a rack may include a "top of rack" switch that is configured to obtain time information from nodes C1 and C2, and to select time information from one of these nodes to pass onto host computing devices 115 within the rack. Each level three set 302 can include any number of level 4 sets 304. Accordingly, the configuration 300 enables the two reference timekeepers 112 represented by nodes R1 and R2 to be shared among a large number of host computing devices 115.

As noted above, each layer of the configuration 300 may include redundant devices. While FIG. 3 shows two redundant devices, three or more devices are possible. This redundancy can ensure continued operation of the network 106 even if cases of failure of a device. While total failure is possible, one problematic situation in the context of time information is a partial failure of a device, whereby the device fails to provide time information with a desired accuracy. For example, an issue with a device or with an interconnect between devices may cause a signal to be delayed. For general communication networks, such delays may be expected and tolerated. However, for time information, such delays can significantly impact synchronization. Accordingly, embodiments of the present disclosure may include within a configuration 300 a timing metadata system 306 configured to analyze metadata regarding operation of devices (e.g., nodes in the configuration 300) to detect potential delays in operation, and in some cases to attribute such delays to particular nodes or edges within the configuration 300.

More specifically, the timing metadata system 306 may obtain metadata from each device in the configuration 300 (e.g., each node, including switches and host computing devices 115) regarding time information received over the network 106. In one embodiment, this metadata reflects jitter in a signal transmitted over the network 106, as measured relative to an internal clock (e.g., a crystal oscillator) of the measuring device. For example, each reference timekeeper 112 may be configured to provide a PPS signal, with an edge aligned to each second. A receiving device (e.g., node A1) may determine the duration between second-aligned edges to determine, e.g., that more or less than a second has elapsed according to its internal clock. Jitter represents the variation in this period, and in general more jitter indicates a higher inaccuracy with respect to time information. However, because jitter compares an internal clock to a network signal, it may not be possible to determine the source of such inaccuracy—that is, jitter may occur due to variance in a devices internal clock, variance in the network signal, or both.

By collecting metadata from multiple points within the network, the timing metadata system 306 may at least partially disambiguate inaccuracies to determine their source. For example, in the configuration 300, both nodes B1 and B2 receive a signal from node A1. An increase in jitter (with respect to the signal from A1) at both nodes B1 and B2 can indicate an issue with operation of A1. An increase in jitter (with respect to the signal from A1) at B1 without a corresponding increase in jitter at B2 can indicate an issue with respect to node B1 or the connection between B1 and A1, rather than with respect to A1 itself. Similarly, B1 is connected to both A1 and A2. If the jitter at B2 increases with respect to the signal of A1 but not with respect to the signal of A2, this can indicate an issue with the connection between B1 and A1 (or, alternatively an issue with A1, which may be ruled out using the logic above). Alternatively, if the jitter at B2 increases with respect to signals of both A1 and A2, this can indicate an issue with B2 (or, alternatively an issue with both A1 and A2, which may be ruled out using the logic above). Accordingly, the timing metadata system 306 may make pairwise comparisons of timing metadata between various nodes at a given level of the configuration 300 to identify particular nodes or edges that are experiencing low-accuracy operation.

While jitter is provided as one example of metadata regarding low-accuracy operation of nodes within the network 106, other types of metadata are possible. For example, in the instance that a node within in the network fails, downstream nodes may continue to retransmit time information further downstream to avoid cascading failure. Illustratively, if node A1 ceases to receive a signal from nodes R1 and R2, node A1 may nevertheless continue to transmit time information downstream to each node B1 and B2, such as by generating a PPS signal based on an internal clock of node A1. Because such signal may be less accurate than a signal locked to a reference timekeeper device, the timing metadata system 306 may collected metadata indicating that a signal of a given node has been decoupled from an upstream node, and may notify downstream nodes that the node A1 is therefore operating with low accuracy. Additionally or alternatively, the node A1 may modify the signal generated by that node to indicate low accuracy, such as by modifying the signal transmitted downstream in a manner that indicates low accuracy information.

On detecting a node or edge experiencing low-accuracy operation, the timing metadata system 306 may notify relevant downstream nodes (e.g., those connected to the node or edge). These downstream nodes, in turn, may be configured to select an alternative upstream source of time information. Thus, if node A1 for example is experiencing low-accuracy operation, each node B1 and B2 may be configured to pass on time information from node A2, allowing the time information from node A1 to be dropped. While not shown in FIG. 3, the timing metadata system 306 may be in network communication with each node. For example, each node and the system 306 may communicate via the network 104 of FIG. 1. Illustratively, the timing metadata system 306 may be implemented as software executing within an instance 116.

As discussed above, another source of inaccuracy in time information is clock drift, whereby a crystal oscillator or other time source within a device operates at a varying frequency, leading to an internal clock of that device running at a variable rate. One known contributor to clock drift is temperature. However, the specific drift experienced by an oscillator at a given temperature may vary according to the particular oscillator in question. Manufacturers may specify such drift statistically, guaranteeing for example a drift within a certain range at a given temperature. Unfortunately, these statistical measures are typically not accurate enough to conduct calibration with respect to an individual oscillator.

Embodiments of the present disclosure can address this problem by providing for device-specific drift measurements. In particular, the metadata collected by the timing metadata system 306 may be utilized to calculate drift measurements relative to temperature on a per-device basis. As noted above, each device may periodically report to the timing metadata system 306 metadata regarding time information obtained over the network. In one embodiment, this metadata includes a delta metric, indicating a difference in the measured versus expected width of the PPS signal (e.g., the signal occurred y nanoseconds before or after expected according to an internal clock). Clock drift may be expected to at least partially account for such a delta. For example, a device may report that a PPS signal occurs around 5 nanoseconds early at a low temperature, and around 5 nanoseconds late at a high temperature. Under these conditions, a drift of 10 nanoseconds can be calculated to occur between the two temperatures. In practice, such clear drift may be difficult to detect with perfect precision. However, statistical analysis may be applied to metadata of a device over a long period of time in order to predict a device-specific drift. For example, the timing metadata system 306 may correlate delta with device temperature (as also reported by each device), such as by calculating an average delta as a function of temperature, e.g., while excluding outliers that result from a device experiencing low-accuracy operation. In some embodiments, drift information (e.g., a drift curve) may be returned from the system 306 to respective devices and used to calibrate an internal clock. For example, a device may apply an offset to time information provided by internal clock, with the offset determined based on device temperature and the drift information. In this way, the accuracy of individual devices (and thus the network 106) is increased.

In some embodiments, the timing metadata system 306 may further be configured to estimate an accuracy of time information for a given host computing device 115. For example, the timing metadata system 306 may obtain metadata regarding operation of each node and edge between a reference timekeeper 112 and a host computing device 115, and analyze the metadata to determine a current accuracy of each node and edge. Potentially inaccuracy bands may be summed among the path from the reference timekeeper 112 and the host computing device 115 to determine an effective accuracy band at the host computing device. For example, where two nodes divide the reference timekeeper 112 and the host computing device 115, with a first node having an accuracy of plus or minus 2 microseconds relative to the reference timekeeper 112 and a second node having an accuracy of plus or minus 3 microseconds relative to the first node, the expected accuracy of host computing device 115 relative to the reference timekeeper 112 may be 5 microseconds. In some embodiments, this information may be combined with an expected accuracy between isolated timing hardware 20 and an instance 116 in order to determine expected accuracy between the instance 116 and the reference timekeeper 112. This expected accuracy may then be provided to the instance 116 as metadata regarding time information obtained from the isolated timing hardware 20. For example, when handling a request for a current time, the isolated timing hardware 20 may respond with the current time and metadata indicating the accuracy of that current time relative to the reference timekeeper 112 (e.g., "it is Jan. 1, 2022, 00:00:00 UTC with an accuracy band of plus or minus 20 microseconds"). Accordingly, an instance 116 may obtain information indicating the expected accuracy of the time information.

Figure 4A:
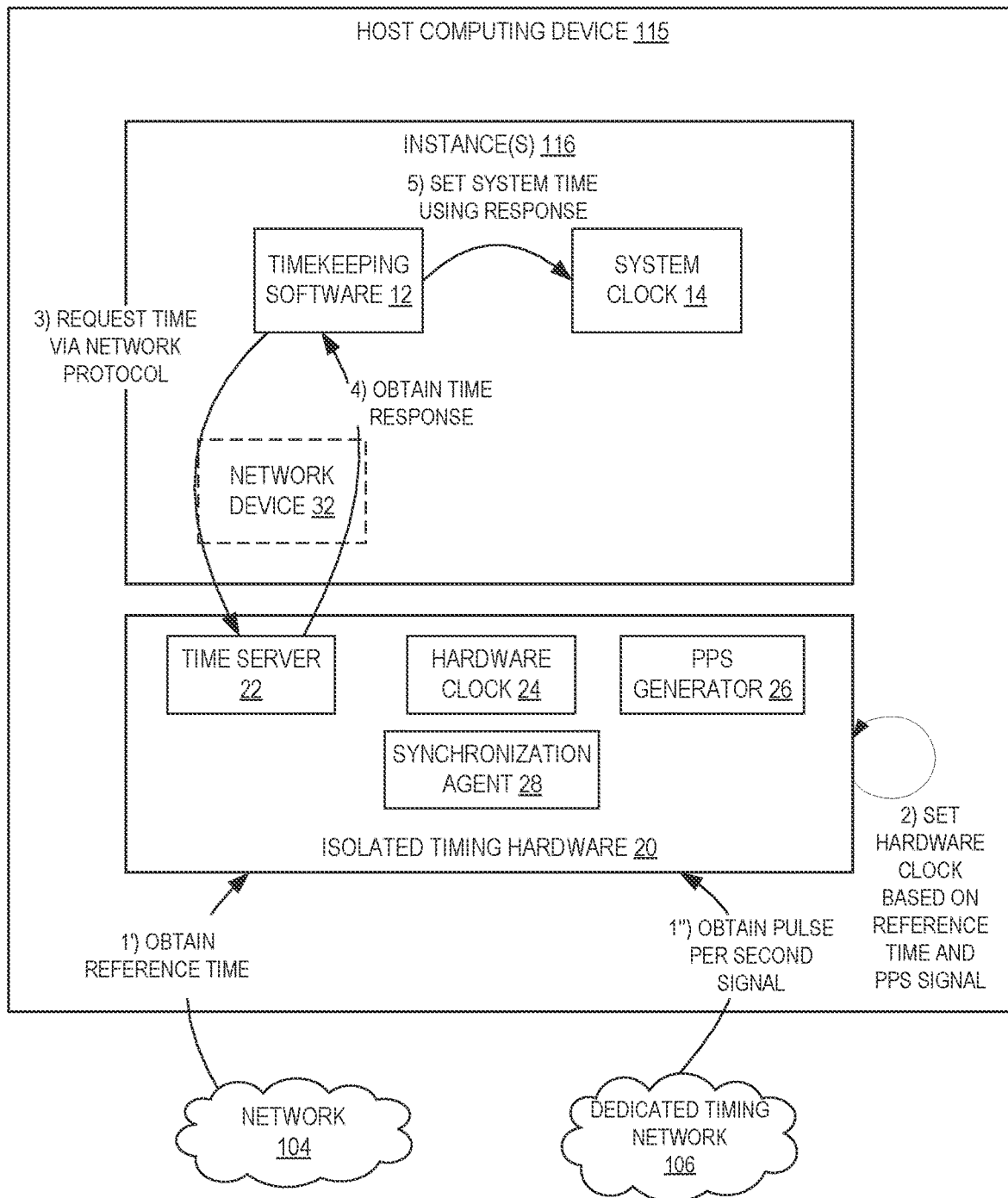
FIGS. 4A-C depict example interactions for synchronizing isolated timing hardware of a host computing device using a dedicated time network of FIG. 1, and for providing a local interface to synchronize system clocks of hosted machine instances with a clock of the isolated timing hardware.
Figure 4B:
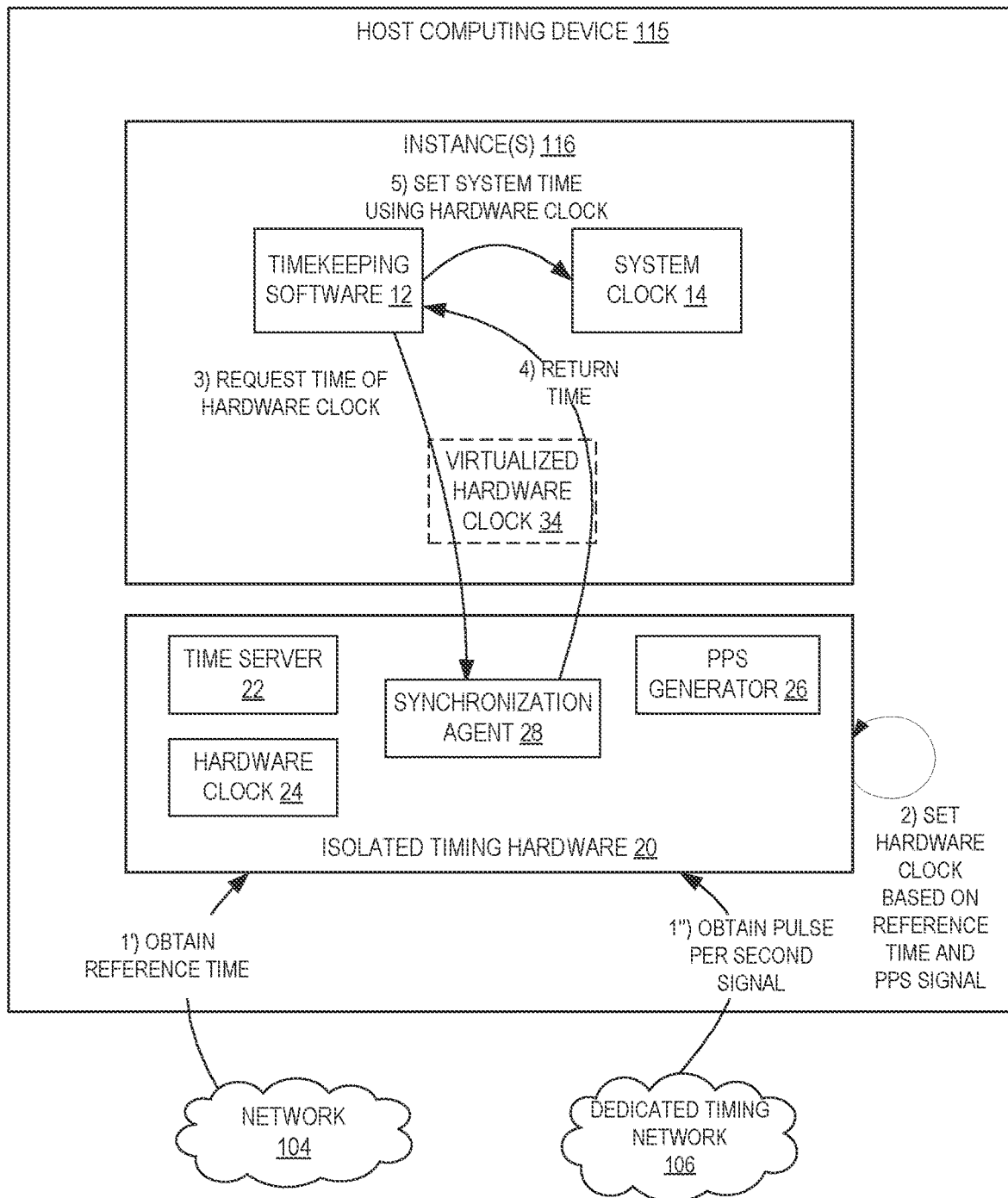
Figure 4C:
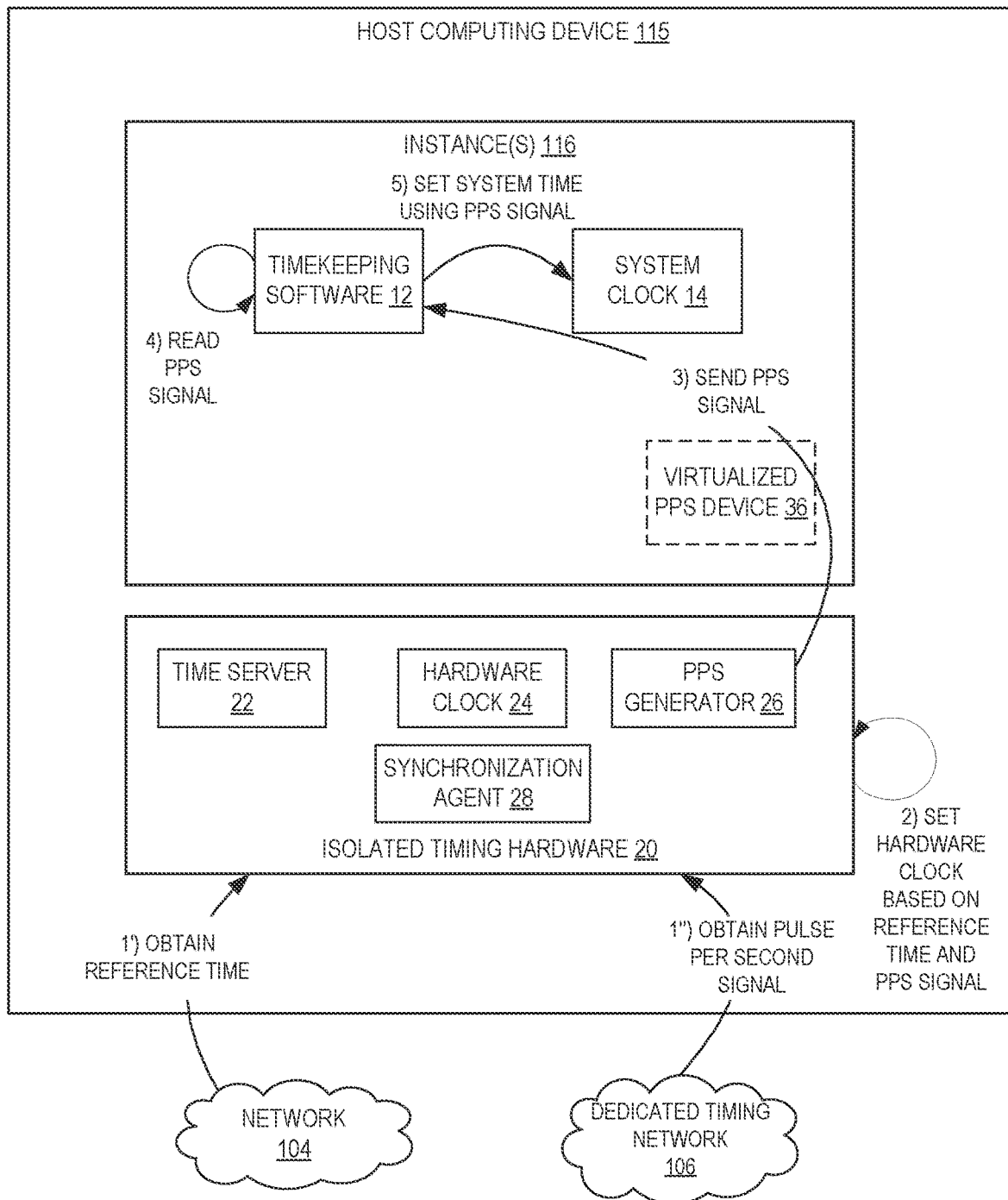

With reference to FIGS. 4A-C, illustrative interactions will be described for synchronizing system clocks of instances 116 with reference timekeepers 112. Specifically, FIG. 4A depicts illustrative interactions for synchronization using a locally-satisfied request in a network-based time protocol, FIG. 4B depicts illustrative interactions for synchronization using a virtualized hardware clock 34, and FIG. 4C depicts illustrative interactions for synchronization using a PPS signal from a virtualized PPS device 36.

In each of FIGS. 4A-C, a host computing device 115 includes isolated timing hardware (e.g., as part of an offload card) with a hardware clock 24. Further, in each of FIGS. 4A-4C, the hardware clock 24 is first synchronized to a reference timekeeper 112, thus enabling the hardware clock 24 to act as a "stratum 1" time source. The interactions for synchronizing a hardware clock 24 to the reference timekeepers 112 are shared among FIGS. 4A-4C, and are thus described commonly. Specifically, these interactions begin at (1') and (1''), where the isolated timing hardware 20 obtains a reference time from the network 104 and a PPS signal from the dedicated time network 106. In one embodiment, the reference time is obtained based on a request transmitted to a remote device via a network-based time protocol, such as NTP or PTP. For example, a reference timekeeper 112 may act as an NTP or PTP server via the network 104. The reference time may indicate a current time, such as the current date, hour, minute, second, etc. For example, the reference time may be provided as a coordinated universal time (UTC) value, a Unix time value, or the like. In contrast, the PPS signal may lack a reference point, and instead indicate an alignment of seconds (analogous to the "ticking" of an analog clock). For example, the PPS may be generated by a top-of-rack switch based on a signal from the reference timekeeper 112 as passed through a dedicated time network 106. However, the PPS signal may be highly accurate relative to the reference time. As such, the PPS signal may be combined with the reference time to determine a present time. Accordingly, at (2), the isolated timing hardware 20 sets a time of the hardware clock 24 based on the reference time and PPS signal.

While FIGS. 4A-C discuss a PPS signal, other fixed-width signals (such as a pulse per half-second, pulse per quarter second, etc.) may be used. In addition to the interactions described above, the isolated timing hardware 20 may implement additional functionalities. For example, where multiple PPS signals are provided (such as via two or more dedicated time networks 106), the isolated timing hardware 20 may be configured to select among the PPS signals based on expected accuracy. Illustratively, where three or more signals are provided, the hardware 20 may identify a "quorum" time by identifying an outlier signal and selecting a PPS signal from remaining signals. In some cases, the hardware 20 may communicate with the timing metadata system 306 of FIG. 3 to obtain metadata regarding each signal, and may select from such signals based on metadata. For example, where the timing metadata system 306 has collected metadata indicating that a device providing a first signal is experiencing inaccuracies, the hardware 20 may select an alternative signal. In addition, the hardware 20 may in some cases use information from the timing metadata system 306 to calibrate the hardware clock 24. For example, the hardware 20 may obtain a drift curve indicating drive of the clock 24 relative to temperature, and adjust timing of the clock 24 based on the drive curve and a current temperature of the hardware 20.

The interactions of FIGS. 4A-4C then vary according to the interface between the instance 116 and the isolated timing hardware 20. With respect to FIG. 4A, the interactions continue at (3), where timekeeping software 12 within the instance 116 transmits a request to a time server 20 on the isolated timing hardware 20. The request is illustratively formatted according to a network-based time protocol, such as NTP or PTP, and thus is transmitted via a virtualized network device 32 of the instance 116. In the embodiment of FIG. 4A, the virtualized network device 32 is supported by the isolated timing hardware 20, and is thus intercepted at the hardware 20 without traversal of the network 104. On intercepting the request, the time server 22 can return the current time, as indicated by the hardware clock 24, at (4). The timekeeping software 12 can then utilize that time to adjust the system clock 14, at (5). Notably, interactions (3)-(5) may be similar to interactions for synchronization utilizing conventional network protocols. This beneficially enables instances 116 to synchronize time with little or no reconfiguration. However, unlike traditional network protocols, the interactions occur locally rather than over a network. In combination with a highly accurate hardware clock 24, these interactions thus facilitate highly accurate synchronization of the system clock 14.

FIG. 4B illustrates an additional or alternative interface between the instance 116 and the isolated timing hardware 20. Specifically, in FIG. 4B, the instance 116 is provided with a virtualized hardware clock 34 addressable as a local device to the instance 116. The virtualized hardware clock 34 may be supported by operation of the synchronization agent 28 in the isolated timing hardware 20. Accordingly, the timekeeping software 12 may at (3) transmit a request to read a current time of the virtualized hardware clock 34, which can be routed to the synchronization agent 28. The synchronization agent can in turn return the current time, as indicated by the hardware clock 24, at (4). The timekeeping software 12 can then utilize that time to adjust the system clock 14, at (5). Notably, interactions (3)-(5) may be similar to interactions for synchronization utilizing actual hardware clocks, such as a GPS-enabled clock physically installed within a computing device. This beneficially enables instances 116 to synchronize time with little or no reconfiguration. However, unlike traditional hardware clocks, the device 115 is not required to physically contain a GPS device, atomic clock, or other highly accurate time source. Instead, such a time source may be shared among many devices 115 in a distributed system, facilitating wide-scale synchronization in that system.

FIG. 4C illustrates yet another possible interface between the instance 116 and the isolated timing hardware 20. Specifically, in FIG. 4C, the instance 116 is provided with a virtualized PPS device 36 addressable as a local device to the instance 116. As noted above, the virtualized PPS device 36 can act as a virtualized representation of a PPS generator 26 within the isolated timing hardware 20, which in turn provides (via the virtualized PPS device 36) a second-aligned signal to the timekeeping software 12, such as in the form of a processor interrupt. Accordingly, the PPS generator 26 sends the signal, at (3), which is read by the timekeeping software 12 at (4) and used to set the system time at (5). Setting the system time using the PPS signal at the timekeeping software 12 may be similar to setting the hardware clock based on the reference time and a PPS signal, discussed as interaction (2), above. For example, because the PPS signal is second-aligned, the timekeeping software 12 may offset the system clock from a current value such that a second boundary occurs simultaneously to the PPS signal. While not shown in FIG. 4C, in some cases the timekeeping software 112 may obtain a reference time, such as via interaction with the time server 22 using a network-based time protocol, and may combine the reference time with the PPS signal to determine a current time. In other cases, the current time of the system clock 14 may be used as a reference time. For example, on detecting the occurrence of a second boundary, the timekeeping software 12 may adjust the system clock 14 to the nearest value indicating a full second.

Figure 5:
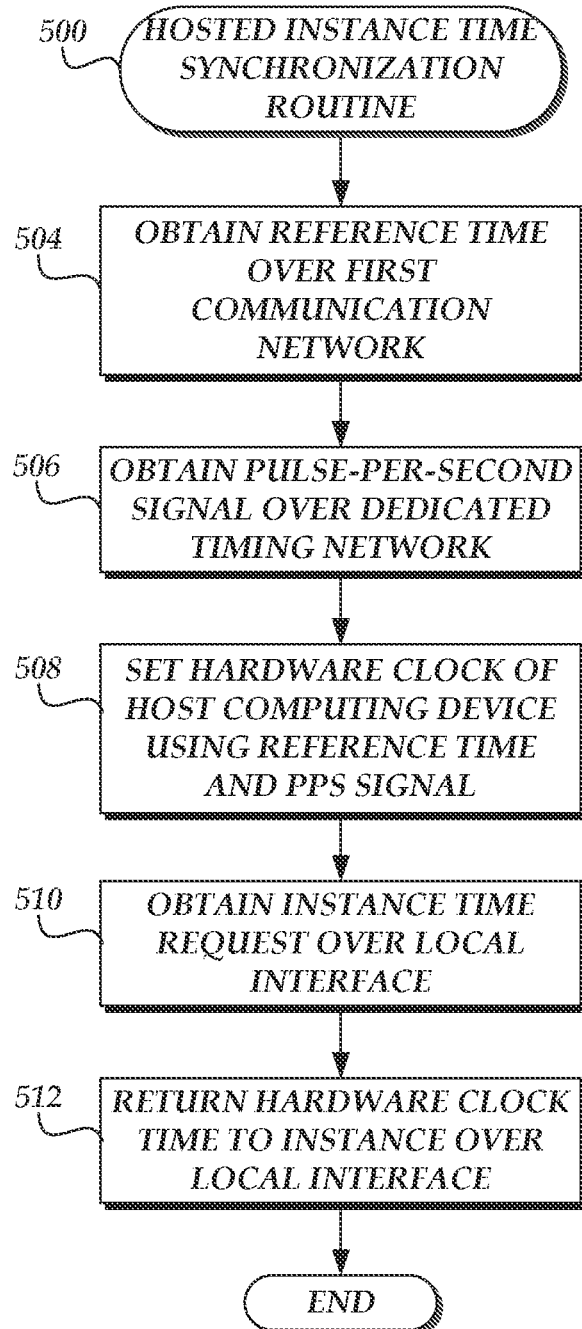
FIG. 5 depicts an illustrative routine for synchronizing hosted machine instances to a reference timekeeper device using a combination of a communication network for the hosted machine instances and a dedicated time network.

With reference to FIG. 5, an illustrative routine 500 will be described for synchronizing hosted machine instances in a distributed computing system with a reference clock. The routine 500 may be implemented, for example, at each host computing device within the distributed computing system. In one embodiment, the routine 500 is implemented by isolated timing hardware of each host computing device, such as within an offload card having computing resources distinct from used to support hosted instances.

The routine 500 begins at block 504, where the host computing device obtains a reference time over a first communication network. The reference time may be provided by a reference clock, such as a synchronized atomic clock or GNSS-enabled device. The first communication network may be, for example, a general communication network, such as a network operating according to the Internet Protocol (IP). Illustratively, the first communication network may be configured to carry communications of hosted instances, such as communications to other hosted instances or other networked devices. Accordingly, the reference time may be expected to include some significant inaccuracy due, for example, to potential congestion on the general communication network. Nevertheless, the reference time may be expected to be accurate within a threshold of a reference timekeeper, such as within hundreds or thousands of microseconds. In one embodiment, the reference time is obtained via a network-based time protocol, such as NTP.

At block 506, the host computing device obtains a pulse-per-second (PPS) signal over a dedicated time network. While a PPS signal is discussed herein as an illustration, other fixed-width signals may be provided. Preferably, period of the signal is sufficiently short to maintain accuracy (e.g., to prevent significant clock drift at a receiving device during the period), and sufficiently long to enable disambiguation of the reference time (e.g., a period of at least 2 times, and potentially a greater multiple, of the worst expected accuracy range of the reference time). The PPS signal may be provided by the same reference clock that has provided the reference time, or by another reference clock synchronized to that other reference clock. The PPS signal is illustratively aligned to an appropriate boundary, e.g., the second boundary. Thus, an edge of the PPS signal can indicate a second boundary (e.g., the rising edge of the signal occurs at each second with respect to the reference clock). The PPS signal may be provided via a dedicated time network, such that the network carries no traffic other than the PPS signal. For example, the dedicated time network may be a non-multiplexed network of fiber optic cable that varies in voltage between a high and low value according to the PPS signal (e.g., with each second being indicated by a rising edge of the PPS signal). The dedicated time network may be a broadcast network, such that a signal transmitted by the reference clock is transmitted to the host computing device and other receiving devices on the network, and such that the host computing device and other receiving devices are unable to transmit on the network. Accordingly, the dedicated time network may be inaccessible to hosted machine instances. In one embodiment, the network contains switches or other network devices that are configured to select a PPS signal from multiple upstream devices (e.g., multiple reference timekeepers) based, for example, on metadata regarding the multiple PPS signals of the upstream devices. In one embodiment, the network is configured according to designs of the White Rabbit Project, which are known in the art.

At block 508, the host computing device sets a hardware clock of the host computing device using the reference time and the PPS signal. Illustratively, the host computing device may align the reference time to a nearest boundary indicated by the PPS signal. For example, if the reference time indicates that a current time is 500 microseconds prior to a given second, and the PPS signal indicates that a second boundary has occurred, the host computing device may set the hardware clock to the given second indicated in the reference time. In this manner, highly accurate relative information (indicated in the PPS signal) and less accurate absolute information (indicated in the reference time) are combined to result in highly accurate absolute information. In some embodiments, the host computing device may contain hardware to set the time of the hardware clock according to the PPS signal. For example, a NIC of the host computing device may include a PHC that is set with each PPS signal according to hardware within the NIC. Accordingly, the hardware clock can be synchronized to the reference clock with a high degree of accuracy. Moreover, because such synchronization can occur at each host computing device, all host computing devices within the distributed system may be synchronized to one another with high accuracy.

While shown in FIG. 5 as an ordered set, in some instances block 504 through 508 may occur in other orders or sequences. For example, block 504 may be implemented at a periodicity longer than block 506 and 508; e.g., the reference time may be obtained every few seconds, while the PPS signal may be obtained and the hardware clock set every second.

Thereafter, the host computing device can be configured to provide the synchronized time to machine instances hosted by the host computing device. As noted above, such instances can include virtual machine instances or bare metal instances. The host computing device can be configured to provide an interface through which such instances can request and receive the time via local communication within the host computing device. For example, the host computing device may provide an NTP server that is accessible via network communications internal to the host computing device (e.g., without traversing an external network). As another example, the host computing device may provide, within each instance, a virtualized hardware clock, from which software of the instance may read a time of the host computing device.

Accordingly, at block 510, the host computing device obtains a request from a hosted machine instance to read the current time. In response, the host computing device returns the time of the hardware clock to the instance over the local interface at block 512. For example, the host computing device may return the current time via a network-based time protocol, like NTP, using local network communications internal to the host computing device. As another example, the host computing device may return a response including the current time from a virtualized hardware clock of the instance. In some embodiments, the response may include an indication of the expected accuracy of the time, calculated as discussed above. While FIG. 5 depicts a request and response pattern, in some embodiments the host computing device may additionally or alternatively "push" time information to instances. For example, each instance may be provided with a virtualized PPS signal used to push the PPS signal obtained from the reference timekeeper into each instance as, for example, an interrupt. The routine 500 may then end.

In some embodiments, FIG. 5 may include additional elements. For example, in some embodiments the host computing device may be configured to adjust its local hardware clock according to drift calculations for that hardware clock. Illustratively, the hardware clock may be expected to drift by at least a small amount over time, such as between PPS signal pulses. In one embodiment, such drift is calculated for the hardware clock individually, such as by collecting statistical information on the deviation between hardware clock time and the PPS signal over multiple periods. This information may be correlated to drift factors, such as temperature of the hardware clock, in order to generate a temperature drift curve for the hardware clock. The host computing device may then adjust its hardware clock according to the expected drift at a current temperature. In this way, accuracy of the hardware clock can be further increased, particularly as the time since a last PPS signal pulse increases. For example, if drift accumulates at an average rate of 50 nanoseconds per second for a given temperature, hardware clock responses near the end of each PPS signal period may be expected to be, on average, 50 nanoseconds off of the reference time. By compensating for such drift, this inaccuracy can be reduced, and accuracy can be maintained between PPS signal pulses even when the hardware clock has known drift during that period.

Figure 6:
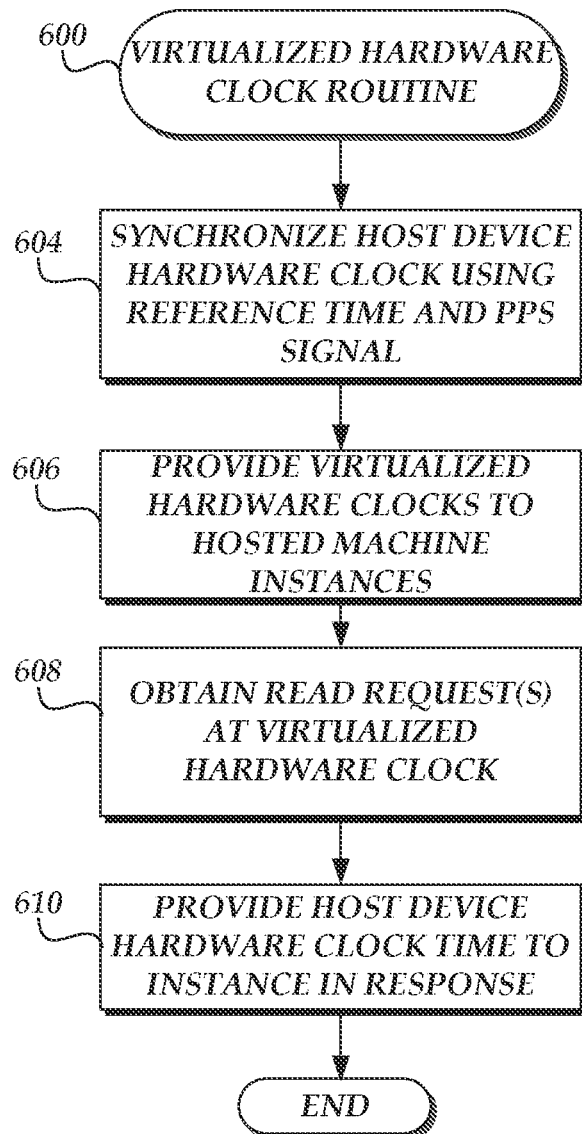
FIG. 6 depicts an illustrative routine for providing a virtualized hardware clock to hosted machine instances, which virtualized hardware clock is synchronized to a reference timekeeper device via a dedicated time network.

With reference to FIG. 6, an illustrative routine 600 will be described for synchronizing a hosted machine instance to a reference timekeeper via a virtualized hardware clock. The routine 600 may be carried out, for example, by a host computing device (such as via isolated timing hardware in the host computing device).

The routine 600 begins at block 604, where the host computing device synchronizes a hardware clock using a reference time and a PPS signal. Synchronization may occur, for example, via the techniques described above with respect to FIG. 5.

At block 606, the host computing device provides virtualized hardware clocks to machine instances hosted on the host computing device. Illustratively, virtualization software may provide the appearance, within each hosted machine instance, of a physical hardware clock that is locally addressable (e.g., at "/dev/phc"). The virtualization software may further enable software within the instance to locally interface with the virtualized hardware clock, such as by issuing a "read" to the virtualized hardware clock that results in a current time of the clock being returned. The virtualization software may route such read requests to isolated timing hardware of the host computing device. Accordingly, at block 608, the hardware may obtain read requests from the instances via the virtualized hardware clock. In response, at block 610, the isolated timing hardware can read a current time of its clock (e.g., a hardware clock within the isolated timing hardware), and respond with the current time, thus providing the host device hardware clock to the instance. In this manner, it may appear from the point of view of each instance that the instance has its own dedicated hardware clock. However, each such clock may in fact by synchronized to a shared hardware clock of the host, which is in turn synchronized to a reference clock via the dedicated time network. Accordingly, the apparently local time of the instances' virtualized hardware clock may in fact be a shared time among the distributed computing system. The routine 600 can then end.

In some embodiments, the host computing device may implement load balancing techniques at block 608 and 610. Illustratively, load balancing may be beneficial when the load of read requests exceeds a capacity of the isolated timing hardware to timely respond. For example, if 100 host machine instances concurrently request a current time via a virtualized hardware clock, the isolated timing hardware may require significant time (e.g., tens or hundreds of microseconds) to respond to all requests, decreasing the accuracy of time information at the hosted instances. To address this situation, load balancing may be implemented that attempts to avoid monopolization of the isolated timing hardware by an individual instance. For example, load balancing may include specific algorithms for selection of an order in which to respond to requests, such as by selecting the order at random, according to a frequency of requests from respective machine instances (e.g., such that instances that have more recently requested a time, or who have requested with higher than a threshold frequency, are ordered later than others), according to service level agreements (SLAs) for the respective instances, or a combination thereof, among other potential orderings. In addition, load balancing may include notifying instances if a request is unable to be responded to in sufficient time. For example, if the isolated timing hardware requires more than a threshold amount of time to response to a given request, the response may include an indication that the request cannot be fulfilled, or an indication that the time in the response may be inaccurate. In some embodiments, load balancing may include creation of "back pressure," such as by instructing an instance (in a response) to request time less frequently or at a different timing (e.g., in the first half of each second, in the last tenth of each second, etc.). Accordingly, the isolated timing hardware may ensure that accurate time information is provided to all hosted machine instances.

Figure 7:
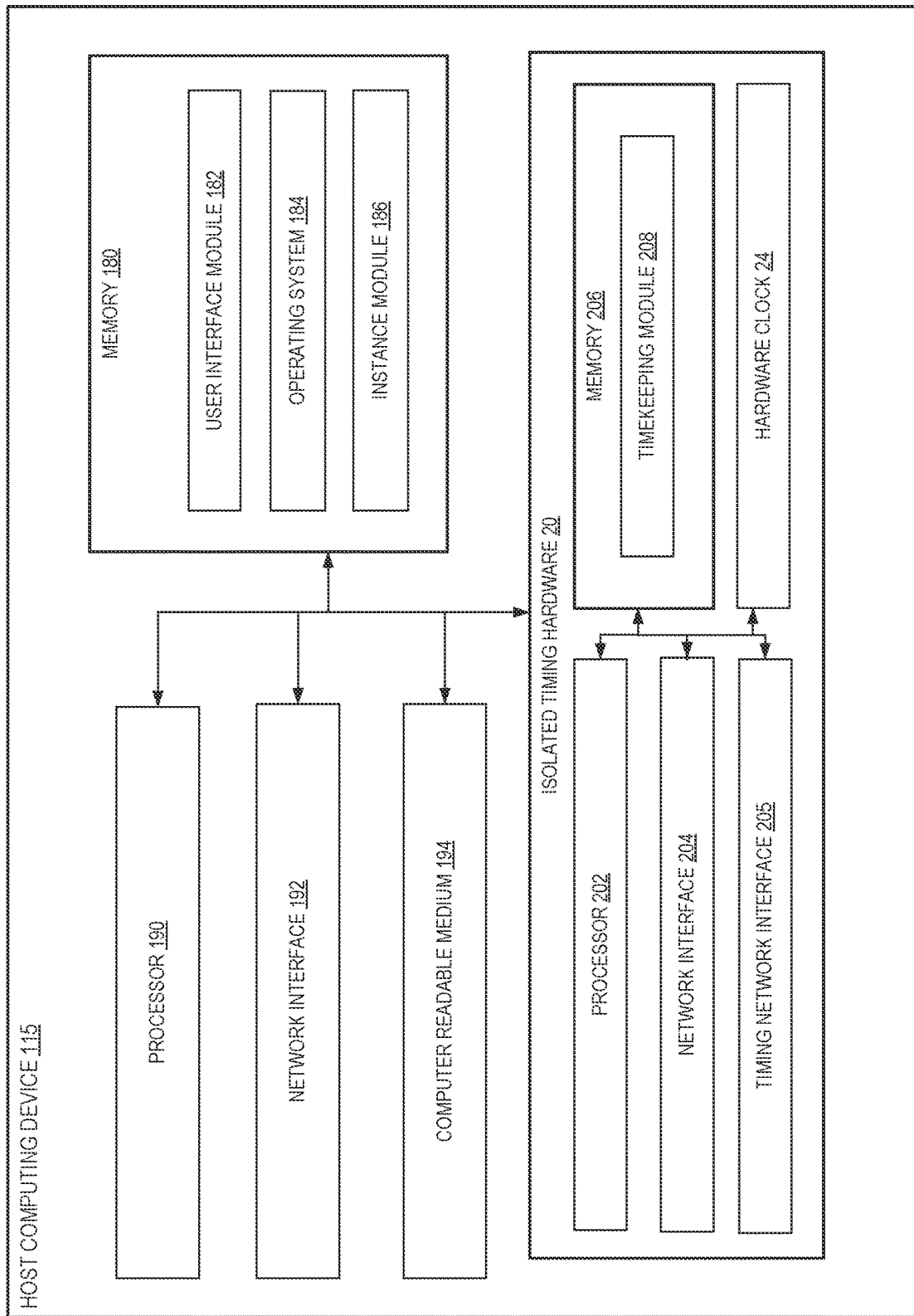
FIG. 7 depicts a general architecture of a computing device or system providing virtualized service devices in accordance with aspects of the present disclosure.

FIG. 7 depicts an example architecture of a computing system (referred to as the host computing device 115) that can be used to perform one or more of the techniques described herein or illustrated in FIGS. 1-6. The general architecture of the host computing device 115 depicted in FIG. 7 includes an arrangement of computer hardware and software modules that may be used to implement one or more aspects of the present disclosure. The host computing device 115 may include many more (or fewer) elements than those shown in FIG. 7. It is not necessary, however, that all of these elements be shown in order to provide an enabling disclosure. As illustrated, the host computing device 115 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the host device 5. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device. In addition to and/or in combination with the user interface module 182, the memory 180 may include an instance module represented code executable to host virtual machine instances, which may utilize components of the host computing device 115 (e.g., the processor 190, network interface 192, etc.) as virtualized hardware supporting execution of those instances.

As discussed above, such an instance (or other software executing within memory 180, particularly in the case of a "bare metal" instance) may thereafter synchronize a system clock of the instance with a reference timekeeper via interaction with isolated timing hardware 20. As shown in FIG. 7, the isolated timing hardware 20 can include hardware isolated from other hardware of the host computing device 115. For example, the isolated timing hardware 20 may be implemented as an expansion card of the host computing device 115. The isolated timing hardware 20 can thus include a processor 202, network interface 204, and memory 206 that functions similarly to but is distinct from the respective processor 190, network interface 192, and memory 180 discussed above. In addition, the isolated timing hardware 20 includes a timing network interface 205 configure to receiving time information from a dedicated time network 106, and a hardware clock 24 that can be synchronized to a reference timekeeper (also on the network 106) via the time information. The memory 206 illustratively includes a timekeeping module 208 executable to implement aspects of the present disclosure, e.g., obtaining time information from the dedicated time network 106 and synchronizing the hardware clock 24 based on that information, and providing interfaces to instances facilitating synchronization with that hardware clock (such as by implementation of a server for providing network-based time information, acting as virtualized hardware clocks for one or more instances, or providing a PPS signal to instances).

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Various example embodiments relating to features described herein can be found in the following clauses:

Clause 1. A system for synchronizing time among hosted machine instances forming a distributed computing environment, the system comprising:
- a reference timekeeper providing a reference clock synchronized to a Global Navigation Satellite System (GNSS);
- a plurality of host computing devices, each host computing device hosting one or more machine instances using a first set of computing resources and including isolated timing hardware utilizing a second distinct set of computing resources;
- a general communication network communicatively coupled to the reference timekeeper and the plurality of host computing devices, the general communication network providing for communication among machine instances hosted by the plurality of host computing devices; and
- a dedicated time network communicatively coupled to the reference timekeeper and the plurality of host computing devices, the dedicated time network accessible to the isolated timing hardware of each host computing device and inaccessible to machine instances hosted by the plurality of host computing devices;
- wherein the isolated timing hardware of an individual host computing device is configured to:
  - obtain a reference time from the reference timekeeper via the general communication network;
  - obtain a pulse-per-second (PPS) signal from the reference timekeeper via the dedicated time network;
  - set a hardware clock of the isolated timing hardware according to the reference time and the PPS signal; and
  - provide an interface enabling the one or more machine instances hosted by the individual host computing device to, locally within the individual host computing device, request a current time of the hardware clock and receive the current time of the hardware clock.

Clause 2. The system of Clause 1, wherein the one or more machine instances comprise at least one of a virtual machine instance or a bare metal instance.

Clause 3. The system of Clause 1, wherein the reference time is obtained according to network time protocol (NTP) communications.

Clause 4. The system of Clause 1, wherein the interface is a network time protocol (NTP) server accessible via local network communications on the host computing device.

Clause 5. A host computing device comprising:
- a first set of computing resources configured to host one or more machine instances; and
- a second set of computing resources, distinct from the first set of computing resources, configured to act as isolated timing hardware at least partly by:
  - obtaining a reference time from one or more reference timekeepers via a first communication network accessible to the one or more machine instances;
  - obtaining a pulse-per-second (PPS) signal from the one or more reference timekeepers via a dedicated time network inaccessible to the one or more machine instances;
  - setting a clock of the isolated timing hardware according to the reference time and the PPS signal; and
  - providing an interface enabling the one or more machine instances to, locally within the host computing device, receive a current time of the clock.

Clause 6. The host computing device of Clause 5, wherein the reference time is synchronized to at least one of an atomic clock or a Global Navigation Satellite System (GNSS).

Clause 7. The host computing device of Clause 5, wherein setting the clock of the isolated timing hardware according to the reference time and the PPS signal comprises aligning the reference time to a nearest second when the PPS signal indicates a second boundary.

Clause 8. The host computing device of Clause 5, wherein the interface is a network time protocol (NTP) server accessible via local network communications on the host computing device, and wherein the second set of computing resources are further configured to act as isolated timing hardware at least partly by:
- obtaining an NTP request from a machine instance of the one or more machine instances for the current time; and
- responding to the machine instance with an NTP response indicating the current time.

Clause 9. The host computing device of Clause 5, wherein the interface comprises a virtualized hardware clock within the one or more machine instances, and wherein the second set of computing resources are further configured to act as isolated timing hardware at least partly by:
- obtaining through the virtualized hardware clock a request to read the current time; and
- providing a response of the current time through the virtualized hardware clock.

Clause 10. The host computing device of Clause 5, wherein the interface comprises a virtualized PPS device within the one or more machine instances, and wherein the second set of computing resources are further configured to act as isolated timing hardware at least partly by providing the PPS signal to the one or more machine instances via the virtualized PPS device.

Clause 11. The host computing device of Clause 10, wherein providing the PPS signal to the one or more machine instances via the virtualized PPS device comprises raising an interrupt on a processor of the one or more machine instances at each second boundary indicated by the PPS signal.

Clause 12. The host computing device of Clause 5, wherein the second set of computing resources are further configured to act as isolated timing hardware at least partly by:
- obtaining metadata regarding a difference between a time indicated by the clock prior to setting the clock and a time indicated by the PPS signal;
- obtaining temperature data of the host computing device;
- transmitting the metadata and the temperature data to a metadata analysis device configured to correlate the metadata and the temperature data to generate a drift information for the clock of the host computing device relative to a temperature of the host computing device;
- obtaining the drift information; and
- calibrating the clock according to the drift information and a current temperature of the host computing device.

Clause 13. A computer-implemented method implemented at a host computing device hosting one or more machine instances, the host computing device including a first set of computing resources configured to host the one or more machine instances and a second set of computing resources, distinct from the first set of computing resources, configured to act as isolated timing hardware, wherein the method comprises, within the isolated timing hardware:
  obtaining a fixed-width signal from one or more reference timekeepers via a dedicated time network inaccessible to the one or more machine instances;
  setting a clock of the isolated timing hardware according to the fixed-width signal; and
  providing an interface enabling the one or more machine instances to, locally within the host computing device, request a current time of the hardware clock and receive the current time of the clock.

Clause 14. The computer-implemented method of Clause 13, wherein the fixed-width signal is a pulse-per-second (PPS) signal.

Clause 15. The computer-implemented method of Clause 13, wherein setting a clock of the isolated timing hardware according to the fixed-width signal comprises obtaining a reference time and setting the clock of the isolated timing hardware according to the fixed-width signal and the reference time.

Clause 16. The computer-implemented method of Clause 15, wherein the reference time is obtained via a general communication network distinct from the dedicated time network.

Clause 17. The computer-implemented method of Clause 13 further comprising, at a network switch in communication with the host computing device, selecting the fixed-width signal for transmission to the host computing device, wherein selecting the fixed-width signal for transmission to the host computing device comprises selecting the fixed-width signal from among multiple fixed-width signals available at the network switch based at least partly on jitter within the fixed-width signal relative to jitter within other fixed-width signals of the multiple fixed-width signals.

Clause 18. The computer-implemented method of Clause 13, wherein the interface is a network time protocol (NTP) server accessible via local network communications on the host computing device, and wherein the method further comprises:
  obtaining an NTP request from a machine instance of the one or more machine instances for the current time; and
  responding to the machine instance with an NTP response indicating the current time.

Clause 19. The computer-implemented method of Clause 13, wherein the interface comprises a virtualized hardware clock within the one or more machine instances, and wherein the method further comprises:
  obtaining through the virtualized hardware clock a request to read the current time; and
  providing a response of the current time through the virtualized hardware clock.

Clause 20. The computer-implemented method of Clause 13, wherein the interface comprises a virtualized pulse-per-second (PPS) device within the one or more machine instances, and wherein the method further comprises providing the PPS signal to the one or more machine instances via the virtualized PPS device.

Various additional example embodiments relating to features described herein can be found in the following clauses:

Clause 1. A system for providing shared hardware clock access to hosted machine instances forming a distributed computing environment, the system comprising:
  a reference timekeeper providing a reference clock synchronized to a Global Navigation Satellite System (GNSS); and
  a plurality of host computing devices, each host computing device hosting one or more machine instances using a first set of computing resources and including isolated timing hardware utilizing a second distinct set of computing resources;
  wherein the isolated timing hardware of an individual host computing device is configured to:
    set a hardware clock of the isolated timing hardware according to a reference time and a pulse-per-second (PPS) signal obtained from the reference timekeeper via a dedicated time network inaccessible to the one or more machine instances hosted by the individual host computing device;
    provide, within each of the one or more machine instances, a virtualized hardware clock, the virtualized hardware clock of each of the one or more machine instances being represented within a respective instance as a locally addressable hardware device;
    obtain, from a machine instance of the one or more machine instances, a request to read a current time from the virtualized hardware clock of the machine instance; and
    return, in response to the request, a current time of the hardware clock of the isolated timing hardware as a response from the virtualized hardware clock.

Clause 2. The system of Clause 1, wherein the one or more machine instances comprise at least one of a virtual machine instance or a bare metal instance.

Clause 3. The system of Clause 1, wherein the hardware clock is a Precision Time Protocol (PTP) hardware clock embedded within a network interface card (NIC) of the isolated timing hardware.

Clause 4. The system of Clause 1, wherein the isolated timing hardware of the individual host computing device is further configured to:
  obtain multiple concurrent requests to read the current time from multiple virtualized hardware clocks of respective machine instances; and
  load balance among the multiple concurrent requests to determine an order in which responses are provided to the multiple concurrent requests.

Clause 5. A host computing device comprising:
  a first set of computing resources configured to host one or more machine instances;
  a second set of computing resources, distinct from the first set of computing resources, configured to act as isolated timing hardware at least partly by:
    setting a clock of the isolated timing hardware according to a reference time and a pulse-per-second (PPS) signal obtained from the reference timekeeper via a dedicated time network inaccessible to the one or more machine instances;
    providing, within each of the one or more machine instances, a virtualized hardware clock, the virtualized hardware clock of each of the one or more machine instances being represented within a respective instance as a locally addressable hardware device;

obtaining, from a machine instance of the one or more machine instances, a request to read a current time from the virtualized hardware clock of the machine instance;

returning, in response to the request, a current time of the clock of the isolated timing hardware as a response from the virtualized hardware clock.

Clause 6. The host device of Clause 5, wherein the second set of computing resources are further configured to act as the isolated timing hardware at least partly by:

obtaining multiple concurrent requests to read the current time from multiple virtualized hardware clocks of respective machine instances; and load balancing among the multiple concurrent requests to determine an order in which responses are provided to the multiple concurrent requests.

Clause 7. The host device of Clause 6, wherein load balancing among the multiple concurrent requests to determine the order in which responses are provided to the multiple concurrent requests comprises determining the order at least partly at random.

Clause 8. The host device of Clause 6, wherein load balancing among the multiple concurrent requests to determine the order in which responses are provided to the multiple concurrent requests comprises determining based at least partly on a frequency of past requests from machine instances associated with the multiple concurrent requests.

Clause 9. The host computing device of Clause 5, wherein the reference time is synchronized to at least one of an atomic clock or a Global Navigation Satellite System (GNSS).

Clause 10. The host computing device of Clause 5, wherein setting the clock of the isolated timing hardware according to the reference time and the PPS signal comprises aligning the reference time to a nearest second when the PPS signal indicates a second boundary.

Clause 11. The host computing device of Clause 5, wherein the second set of computing resources are further configured to provide a network time protocol (NTP) server accessible to the one or more machine instances via local network communications on the host computing device.

Clause 12. The host computing device of Clause 5, wherein the second set of computing resources are further configured provide the PPS signal to the one or more machine instances via a virtualized PPS device.

Clause 13. The host computing device of Clause 5, wherein the second set of computing resources are further configured to:

obtain metadata regarding a difference between a time indicated by the clock prior to setting the clock and a time indicated by the PPS signal;

obtain temperature data of the host computing device;

transmit the metadata and the temperature data to a metadata analysis device configured to correlate the metadata and the temperature data to generate a drift information for the clock of the host computing device relative to a temperature of the host computing device;

obtain the drift information; and calibrate the clock according to the drift information and a current temperature of the host computing device.

Clause 14. A computer-implemented method implemented at a host computing device hosting one or more machine instances, the host computing device including a first set of computing resources configured to host the one or more machine instances and a second set of computing resources, distinct from the first set of computing resources, configured to act as isolated timing hardware, wherein the method comprises, within the isolated timing hardware:

setting a clock of the isolated timing hardware according to a fixed-width signal obtained from the reference timekeeper via a dedicated time network inaccessible to the one or more machine instances;

providing, within each of the one or more machine instances, a virtualized hardware clock, the virtualized hardware clock of each of the one or more machine instances being represented within a respective instance as a locally addressable hardware device;

obtaining, from a machine instance of the one or more machine instances, a request to read a current time from the virtualized hardware clock of the machine instance; and returning, in response to the request, a current time of the clock of the isolated timing hardware.

Clause 15. The computer-implemented method of Clause 14 further comprising:

obtaining multiple concurrent requests to read the current time from multiple virtualized hardware clocks of respective machine instances; and load balancing among the multiple concurrent requests to determine an order in which responses are provided to the multiple concurrent requests.

Clause 16. The computer-implemented method of Clause 15, wherein load balancing among the multiple concurrent requests to determine the order in which responses are provided to the multiple concurrent requests comprises determining the order at least partly at random.

Clause 17. The computer-implemented method of Clause 15, wherein load balancing among the multiple concurrent requests to determine the order in which responses are provided to the multiple concurrent requests comprises determining based at least partly on a frequency of past requests from machine instances associated with the multiple concurrent requests.

Clause 18. The computer-implemented method of Clause 14 further comprising, at a network switch in communication with the host computing device, selecting the fixed-width signal for transmission to the host computing device, wherein selecting the fixed-width signal for transmission to the host computing device comprises selecting the fixed-width signal from among multiple fixed-width signals available at the network switch based at least partly on jitter within the fixed-width signal relative to jitter within other fixed-width signals of the multiple fixed-width signals.

Clause 19. The computer-implemented method of Clause 14, wherein the fixed-width signal is a pulse-per-second (PPS) signal.

Clause 20. The computer-implemented method of Clause 14, wherein setting a clock of the isolated timing hardware according to the fixed-width signal comprises obtaining a reference time and setting the clock of the isolated timing hardware according to the fixed-width signal and the reference time.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

The invention claimed is:

1. A system for providing shared hardware clock access to hosted machine instances forming a distributed computing environment, the system comprising:
   a reference timekeeper providing a reference clock synchronized to a Global Navigation Satellite System (GNSS); and
   a plurality of host computing devices, each host computing device hosting one or more machine instances using a first set of computing resources and including isolated timing hardware utilizing a second distinct set of computing resources;
   wherein the isolated timing hardware of an individual host computing device is configured to:
      set a hardware clock of the isolated timing hardware according to a reference time and a pulse-per-second (PPS) signal obtained from the reference timekeeper via a dedicated time network inaccessible to the one or more machine instances hosted by the individual host computing device;
      provide, within each of the one or more machine instances, a virtualized hardware clock, the virtualized hardware clock of each of the one or more machine instances being represented within a respective instance as a locally addressable hardware device;
      obtain, from a machine instance of the one or more machine instances, a request to read a current time from the virtualized hardware clock of the machine instance; and
      return, in response to the request, a current time of the hardware clock of the isolated timing hardware as a response from the virtualized hardware clock.

2. The system of claim 1, wherein the one or more machine instances comprise at least one of a virtual machine instance or a bare metal instance.

3. The system of claim 1, wherein the hardware clock is a Precision Time Protocol (PTP) hardware clock embedded within a network interface card (NIC) of the isolated timing hardware.

4. The system of claim 1, wherein the isolated timing hardware of the individual host computing device is further configured to:
   obtain multiple concurrent requests to read the current time from multiple virtualized hardware clocks of respective machine instances; and
   load balance among the multiple concurrent requests to determine an order in which responses are provided to the multiple concurrent requests.

5. A host computing device comprising:
   a first set of computing resources configured to host one or more machine instances;
   a second set of computing resources, distinct from the first set of computing resources, configured to act as isolated timing hardware at least partly by:
      setting a clock of the isolated timing hardware according to a reference time and a pulse-per-second (PPS) signal obtained from the reference timekeeper via a dedicated time network inaccessible to the one or more machine instances wherein the reference timekeeper is in communication with the dedicated time network;
      providing, within each of the one or more machine instances, a virtualized hardware clock, the virtualized hardware clock of each of the one or more machine instances being represented within a respective instance as a locally addressable hardware device;
      obtaining, from a machine instance of the one or more machine instances, a request to read a current time from the virtualized hardware clock of the machine instance;
      returning, in response to the request, a current time of the clock of the isolated timing hardware as a response from the virtualized hardware clock.

6. The host device of claim 5, wherein the second set of computing resources are further configured to act as the isolated timing hardware at least partly by:
   obtaining multiple concurrent requests to read the current time from multiple virtualized hardware clocks of respective machine instances; and
   load balancing among the multiple concurrent requests to determine an order in which responses are provided to the multiple concurrent requests.

7. The host device of claim 6, wherein load balancing among the multiple concurrent requests to determine the order in which responses are provided to the multiple concurrent requests comprises determining the order at least partly at random.

8. The host device of claim 6, wherein load balancing among the multiple concurrent requests to determine the order in which responses are provided to the multiple concurrent requests comprises determining based at least partly on a frequency of past requests from machine instances associated with the multiple concurrent requests.

9. The host computing device of claim 5, wherein the reference time is synchronized to at least one of an atomic clock or a Global Navigation Satellite System (GNSS).

10. The host computing device of claim 5, wherein setting the clock of the isolated timing hardware according to the reference time and the PPS signal comprises aligning the reference time to a nearest second when the PPS signal indicates a second boundary.

11. The host computing device of claim 5, wherein the second set of computing resources are further configured to provide a network time protocol (NTP) server accessible to the one or more machine instances via local network communications on the host computing device.

12. The host computing device of claim 5, wherein the second set of computing resources are further configured provide the PPS signal to the one or more machine instances via a virtualized PPS device.

13. The host computing device of claim 5, wherein the second set of computing resources are further configured to:
 obtain metadata regarding a difference between a time indicated by the clock prior to setting the clock and a time indicated by the PPS signal;
 obtain temperature data of the host computing device;
 transmit the metadata and the temperature data to a metadata analysis device configured to correlate the metadata and the temperature data to generate a drift information for the clock of the host computing device relative to a temperature of the host computing device;
 obtain the drift information; and
 calibrate the clock according to the drift information and a current temperature of the host computing device.

14. A computer-implemented method implemented at a host computing device hosting one or more machine instances, the host computing device including a first set of computing resources configured to host the one or more machine instances and a second set of computing resources, distinct from the first set of computing resources, configured to act as isolated timing hardware, wherein the method comprises, within the isolated timing hardware:
 setting a clock of the isolated timing hardware according to a fixed-width signal obtained from the reference timekeeper via a dedicated time network inaccessible to the one or more machine instances, wherein the reference timekeeper is in communication with the dedicated time network;
 providing, within each of the one or more machine instances, a virtualized hardware clock, the virtualized hardware clock of each of the one or more machine instances being represented within a respective instance as a locally addressable hardware device;
 obtaining, from a machine instance of the one or more machine instances, a request to read a current time from the virtualized hardware clock of the machine instance; and
 returning, in response to the request, a current time of the clock of the isolated timing hardware.

15. The computer-implemented method of claim 14 further comprising:
 obtaining multiple concurrent requests to read the current time from multiple virtualized hardware clocks of respective machine instances; and
 load balancing among the multiple concurrent requests to determine an order in which responses are provided to the multiple concurrent requests.

16. The computer-implemented method of claim 15, wherein load balancing among the multiple concurrent requests to determine the order in which responses are provided to the multiple concurrent requests comprises determining the order at least partly at random.

17. The computer-implemented method of claim 15, wherein load balancing among the multiple concurrent requests to determine the order in which responses are provided to the multiple concurrent requests comprises determining based at least partly on a frequency of past requests from machine instances associated with the multiple concurrent requests.

18. The computer-implemented method of claim 14 further comprising, at a network switch in communication with the host computing device, selecting the fixed-width signal for transmission to the host computing device, wherein selecting the fixed-width signal for transmission to the host computing device comprises selecting the fixed-width signal from among multiple fixed-width signals available at the network switch based at least partly on jitter within the fixed-width signal relative to jitter within other fixed-width signals of the multiple fixed-width signals.

19. The computer-implemented method of claim 14, wherein the fixed-width signal is a pulse-per-second (PPS) signal.

20. The computer-implemented method of claim 14, wherein setting a clock of the isolated timing hardware according to the fixed-width signal comprises obtaining a reference time and setting the clock of the isolated timing hardware according to the fixed-width signal and the reference time.

* * * * *